SELECTIVE CROSS-OVER DEVICES

Filed Sept. 7, 1954 14 Sheets-Sheet 1

John V. Fredd
Harry B. Schramm
INVENTORS

BY

Browning, Simms & Hyer
ATTORNEYS

John V. Fredd
Harry B. Schramm
INVENTORS

BY
Browning, Simms & Hyer
ATTORNEYS

Nov. 14, 1961 J. V. FREDD ET AL 3,008,522

SELECTIVE CROSS-OVER DEVICES

Filed Sept. 7, 1954 14 Sheets-Sheet 3

John V. Fredd
Harry B. Schramm
INVENTORS

BY
Browning, Simms & Hyer
ATTORNEYS

John V. Fredd
Harry B. Schramm
INVENTORS

BY

Browning, Simms & Hyer
ATTORNEYS

SELECTIVE CROSS-OVER DEVICES

Filed Sept. 7, 1954 14 Sheets-Sheet 5

John V. Fredd
Harry B. Schramm
INVENTORS

BY

Browning, Simms & Hyer
ATTORNEYS

John V. Fredd
Harry B. Schramm
INVENTORS

BY
Browning, Simms & Hyer
ATTORNEYS

SELECTIVE CROSS-OVER DEVICES

Filed Sept. 7, 1954 14 Sheets-Sheet 7

John V. Fredd
Harry B. Schramm
INVENTORS

BY
Browning, Simms & Hyer
ATTORNEYS

John V. Fredd
Harry B. Schramm
INVENTORS

BY
Browning, Simms & Hyer
ATTORNEYS

SELECTIVE CROSS-OVER DEVICES

Filed Sept. 7, 1954 14 Sheets-Sheet 9

John V. Fredd
Harry B. Schramm
INVENTORS

BY

Browning, Simms & Hyer
ATTORNEYS

SELECTIVE CROSS-OVER DEVICES

Filed Sept. 7, 1954 14 Sheets-Sheet 10

John V. Fredd
Harry B. Schramm
INVENTORS

BY

Browning, Simms & Hyer
ATTORNEYS

Nov. 14, 1961 J. V. FREDD ET AL 3,008,522

SELECTIVE CROSS-OVER DEVICES

Filed Sept. 7, 1954 14 Sheets-Sheet 11

John V. Fredd
Harry B. Schramm
INVENTORS

BY

Browning, Simms & Hyer
ATTORNEYS

SELECTIVE CROSS-OVER DEVICES

John V. Fredd
Harry B. Schramm
INVENTORS

BY
Browning, Simms & Hyer
ATTORNEYS

John V. Fredd
Harry B. Schramm
INVENTORS

BY
Browning, Simms & Hyer
ATTORNEYS

John V. Fredd
Harry B. Schramm
INVENTORS

BY
Browning, Simms & Hyer
ATTORNEYS

United States Patent Office 3,008,522

Patented Nov. 14, 1961

3,008,522

SELECTIVE CROSS-OVER DEVICES

John V. Fredd and Harry B. Schramm, Dallas, Tex., assignors to Otis Engineering Corporation, Dallas, Tex., a corporation of Texas Filed Sept. 7, 1954, Ser. No. 454,383

17 Claims. (Cl. 166—115)

This invention relates to improvements in selective cross-over devices of the general type disclosed in a co-pending application entitled "Selective Cross-Over Packer," Serial No. 147,785, filed March 6, 1950, now matured into Patent No. 2,766,831. More particularly, this invention relates to a selective cross-over device especially well suited for use in permanently completed wells.

Permanently completed wells are those in which the well tubing and well head equipment are installed only once, thereby enabling the drilling rig to be removed from location prior to completing and producing the well, as well as reworking the lower formation. Such operations may be performed several days later by various tools which are lowered into the tubing on a wire line or similar means. A requirement of permanent completion is that the tubing as well as all flow connections therewith be at least substantially "full opening" such that the various work-over and production tools may be passed therethrough.

From a cursory examination of the device disclosed in the afore-mentioned patent, it is obvious that the use of such a device in a permanently completed well was not contemplated. That is, it can be seen that the flow passage through the housing is not substantially "full opening" but, to the contrary, is restricted with respect to the inside tubing diameter. It will be understood, therefore, that the minimum inside diameter through the device, rather than that through the tubing, would govern the size and capacity of a tool to be run therethrough.

For those skilled in the art and familiar with the demands of the "slim hole" trend in the industry, a satisfactory answer was not to be found in merely enlarging the minimum diameter of the earlier conceived selective crossover packer. Obviously, such a step would also enlarge the outside diameter of the tool and necessitate an enlarged hole for the same production.

Examining this earlier conceived tool more closely, it will be seen that the opening therethrough, or flow passage through the housing, is restricted in two locations. First, the landing device on each of the removable flow directing tools is dependent for operation upon a projection into such flow passage. The tail pipe fixedly disposed within and spaced from the outer housing sleeve is a second restriction.

An object of this invention is to provide a well tool for wells having multiple formations which facilitates the performance of testing, completing work-over and production operations in connection with the formations without the necessity of pulling the tubing.

It is another object to provide a well tool for use in permanently completed, dual production wells and operable for selectively providing either regular or cross-over flow courses for production zones thereof.

Still another object is to provide apparatus for a two-zone well which makes possible the control of the production flow from each zone in a section of the well tubing by means of removable tools, as by safety valves, regulators, flow meters, or the like.

It is still another object to provide an improved selective cross-over device which is compatible with the slim hole trend in that the tubular housing thereof is of single wall construction through the portion to be packed off within the well casing.

A still further object is to provide an improved selective cross-over device in which all packing elements sealingly engageable between the flow directing tools and housing are carried by and removable with such tools, whereby not only may the housing flow passage be made full opening but also the packing elements may be replaced without removal of the tubing string.

It is still another object to provide novel means for testing the sealing engagement of packing elements disposed between well conduits and, more especially, to provide such novel testing means in conjunction with a work-over tool.

Other objects, advantages and features of this invention will be apparent to one skilled in the art upon a consideration of the written specification, the attached claims and the annexed drawings.

In accordance with the present invention, there is provided an improved selective cross-over device comprising a tubular housing adapted to be connected in a string of well tubing and packed off within a well casing above the upper formation of a permanently completed dual production well and having a flow passage therethrough which will accommodate work-over and production tools runable through the tubing. As well, the device includes a series of tools selectively disposable within the housing flow passage for simultaneously directing flow from each of the two production zones in either cross-over or conventional fashion and further for performing certain work-over operations upon the lower of said production zones.

The flow passage through the housing is of a minimum diameter corresponding to the drift diameter of the tubing and extending from one end thereof to the other. A portion of such flow passage is recessed to provide a means cooperable with parts on each of the removable tools for landing the same in proper position within the housing. As well, the housing of this device is provided with openings therethrough communicating the flow passage with the housing exterior above and below the portion thereof to be packed off. More particularly, the opening communicating with the housing exterior above said portion intersects the flow passage on a level above the intersection of the other opening communicating with the housing exterior below said portion. In this manner, the housing portion adapted to be packed off may be of single wall construction.

Each of the selectively usable tools is provided with a mandrel having a flow passage therein and longitudinally extendible through the housing flow passage and spaced from the housing portion to be packed off when properly positioned therein to define an annular flow passage therebetween. All packing elements sealably engageable between the tools and housing are carried by the tools such that they may be replaced when necessary upon removal of such tools. With the annular flow passage thus defined by the removable tool and with the packing elements on the tool in position for sealably engaging sealing surfaces on the housing, it will be understood that two separate flow paths are provided through the portion of the housing portion to be packed off without the necessity of increasing the size of the hole.

The packing elements are arranged for sealing engagement with the surfaces on the housing and cooperation with the above flow paths such that one of the upper end of the housing and upper opening therethrough is communicated with one of the lower end of the housing and the lower opening therethrough through each of the flow passages within the tool mandrel and the annular flow passage. More particularly, the cross-over tools are so constructed as to direct flow from the lower end of the housing into the upper opening therethrough and from the lower opening therethrough into the upper end of the housing, while the regular flow tools are constructed to direct flow from the lower end of the housing into the upper end thereof and from the lower opening therethrough into the upper opening. In this manner, flow from each of the two formations may be selectively produced in either regular or cross-over fashion.

However, in view of the above-described novel structure of this device, upon removal of the cross-over or regular flow tool from the housing flow passage, various work-over and production tools may be passed therethrough or disposed therein. For example, a safety valve for preventing flow through the tubing when such flow reaches a predetermined rate may be installed within the tubing by being run through the tubular housing of this device on the end of one of the removable tools. In particular, a third tool in the form of an extension hanger is landable within the housing for communicating the upper housing opening with the lower end of the housing through one flow passage and the upper end of the housing with the lower end thereof through a separate flow passage. This latter tool serves in effect as an extension of the lower end of the tubing and provides a means of circulating fluid in the lower production zone and, if desired in conjunction with a check valve, may be used for performing squeeze jobs on said lower zone, both of which operations are well known to those skilled in the art and to which further reference will be made hereinafter.

In the drawings, wherein like reference characters are used throughout to designate like parts:

FIGS. 1 to 3, inclusive, are schematic views of one embodiment of the improved selective cross-over device of the present invention, with the tubular housing of the device connected in a string of tubing and packed off within the well casing; FIG. 1 showing a cross-over tool landed within the housing, FIG. 2 a regular or conventional flow tool landed therein, and FIG. 3 a work-over tool in the form of an extension hanger landed within the housing, each of said figures indicating by arrows the flow paths established within the housing by means of each of the respective tools;

FIGS. 4 to 8, inclusive, are views similar to FIGS. 1 to 3 and showing a second embodiment of the selective cross-over device of the present invention; FIGS. 4 and 5 illustrating alternate types of cross-over tools disposable in the housing of this particular embodiment; FIG. 6 illustrating a regular or conventional flow tool usable with either type of cross-over tool; and FIGS. 7 and 8 illustrating alternate types of extension hangers landable within the tubular housing;

FIGS. 9 and 10 are schematic views similar to the foregoing showing another embodiment of the present invention and particularly one through which various production tools may be passed; FIG. 9 showing a cross-over tool landed within the tubular housing of the device and FIG. 10 showing a regular or conventional flow tool similarly landed;

FIGS. 11 to 13, inclusive, are schematic views of still another embodiment of the present invention which is similar to that shown in FIGS. 9 and 10, except that the removable cross-over and regular flow tools shown in FIGS. 11 and 12, respectively, are formed in separable parts and further in which still another removable tool is provided as shown in FIG. 13 for "Hydrafrac" of the upper production zone;

FIGS. 14 to 16, inclusive, are schematic views of yet another embodiment of the selective cross-over device of the present invention; FIG. 14 showing a cross-over tool landed within the tubular housing of this embodiment, FIG. 15 showing a regular or conventional flow tool landed therein, and FIG. 16 showing a work-over tool in the form of an extension hanger landed within said housing;

FIGS. 17A to 17D, inclusive, are enlarged detailed sectional views of the cross-over tool landed within the tubular housing of the first embodiment of the device shown in FIG. 1; FIG. 17A illustrating a landing device of a type common to all but the extension hangers shown in connection with several of the embodiments, FIG. 17B illustrating an upper portion of the device beneath FIG. 17A, including an opening through the housing communicating with the housing exterior above the packer, FIG. 17C illustrating a retrievable type packer carried by the housing below FIG. 17B for packing the same off within the well casing, and FIG. 17D illustrating a by-pass conduit in the lower opening through the housing and an equalizer valve on the lower end of the cross-over tool;

FIG. 20A illustrating a check valve for use in circulating and squeeze jobs and FIG. 20B illustrating the manner in which the lower opening in the housing is packed off by elements carried on the extension hanger;

FIG. 21A illustrating in broken lines a non-retrievable type packer within the well casing and upon which the tubular housing is adapted to rest when packed off within the casing;

FIG. 24B illustrating in particular the afore-mentioned packing element testing means;

Figure 13:
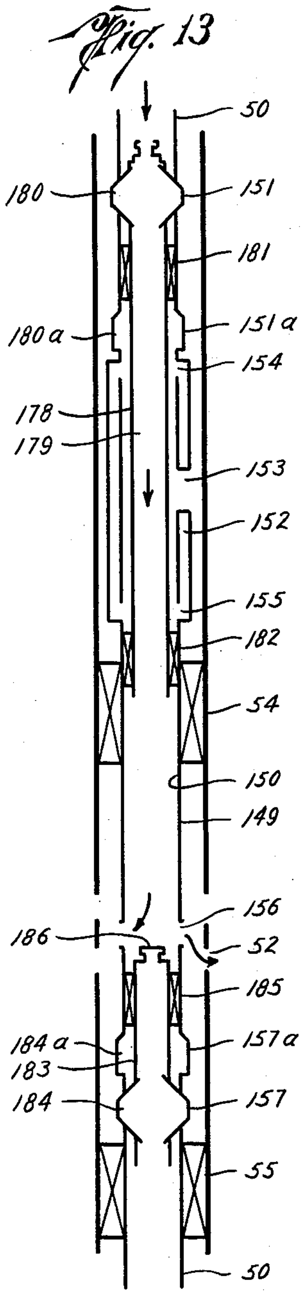
Figure 16:
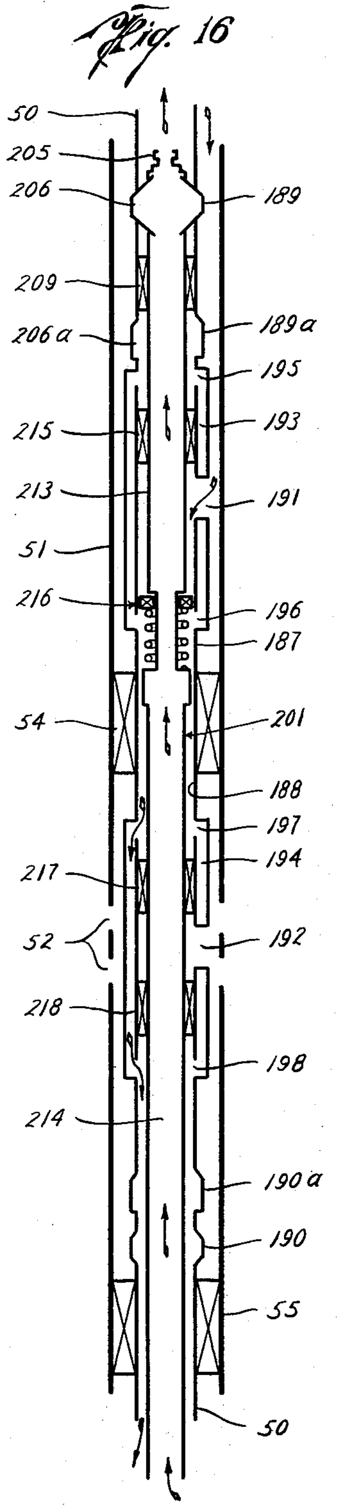
Figure 20B:
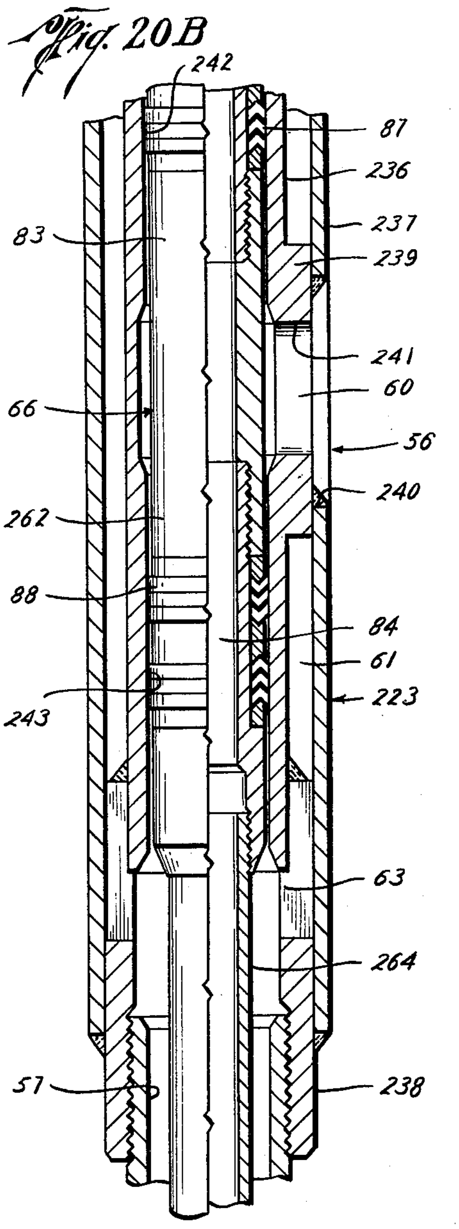
FIGS. 20A and 20B are detailed sectional views of a part of an extension hanger landed in place within the tubular housing of the first embodiment shown in FIG. 3.
Figure 20A:
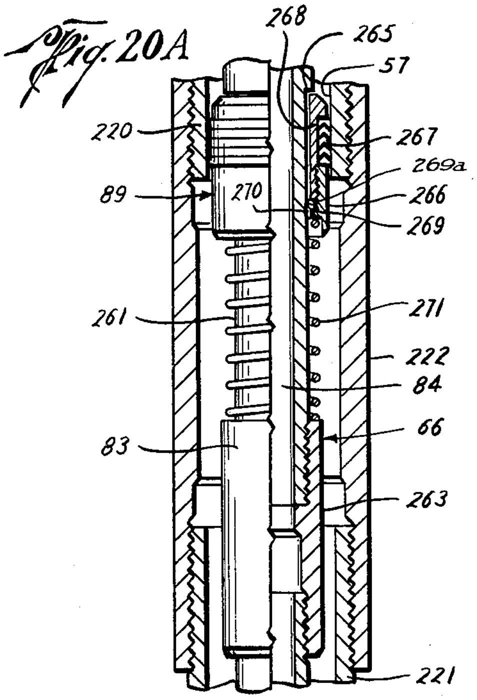
Figures 29, 30:
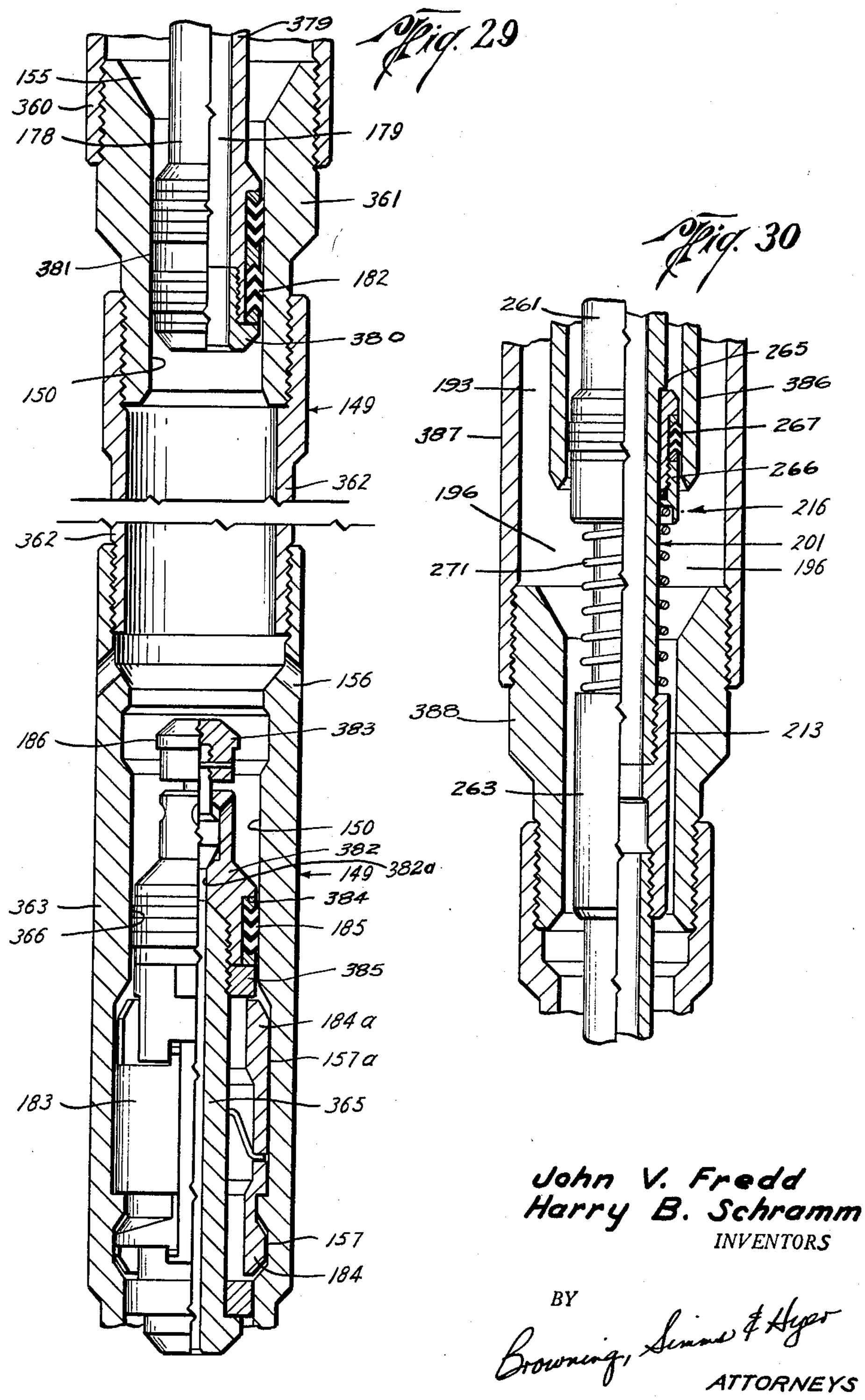

FIG. 29 is a detailed sectional view, broken away intermediate the top and bottom thereof, the removable tool and housing of the embodiment shown in FIG. 13; and FIG. 30 is a detailed sectional view of the embodiment of this invention shown in FIG. 16, and particularly that portion of the embodiment in which a check valve similar to that shown in FIG. 20A is carried by the extension hanger landed within the tubular housing.

Figure 1:
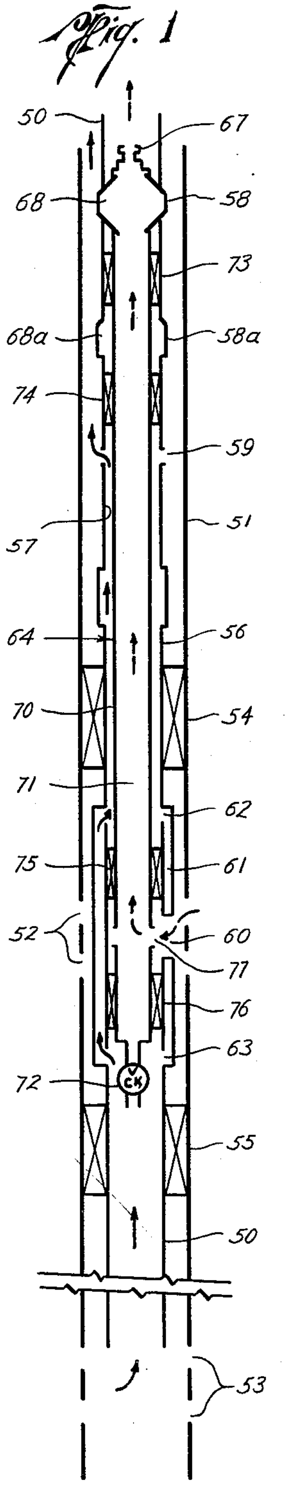

In each of the schematic views of FIGS. 1 to 16, the device is shown connected in a string of well tubing 50 disposed within a well casing 51 in a manner well known in the art. As shown in FIG. 1, the casing is perforated at 52 and 53 for communication, respectively, with the upper and lower producing formations. A packer 54, which may or may not be carried by the device, serves to pack off the same above the upper zone or formation, while a packer 55 packs off the tubing below the device intermediate the upper and lower zones. Of course, in a manner well known in the art and illustrated in the afore-mentioned copending application, flow from one of the zones may be produced through the upper end of the tubing simultaneously with production from the other zone through the annulus between the tubing and casing to well head equipment not shown herein. The packer 55 may be of a type shown in page 496 of the 1954–55 issue of the Composite Catalog of Oil Field and Pipeline Equipment. Also, the tubing 50 may include a nipple of the type shown on page 503 of the aforementioned issue of the Composite Catalog for effecting a fluid-tight seal between the tubing and the smooth bore of the packer.

Figure 2:
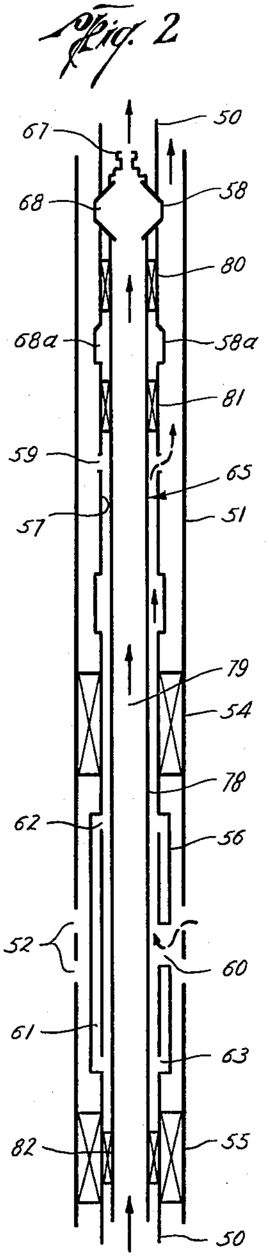
Figure 3:
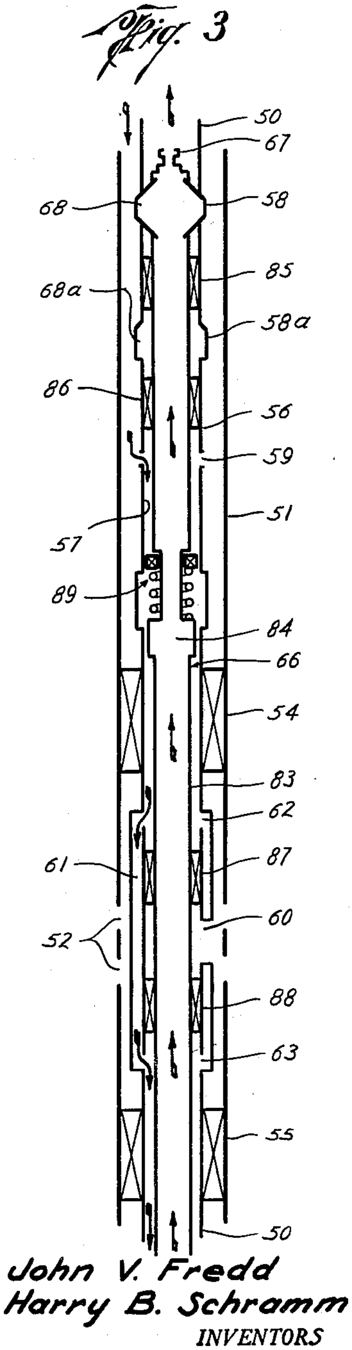

Turning first to the embodiment shown in FIGS. 1 to 3, the device comprises a tubular housing 56 connected in the tubing string and having a flow passage 57 extending therethrough from one end to the other which is of a minimum diameter corresponding to the drift diameter of the tubing. The upper end of the housing is provided with portions 58 and 58*a* recessed from the flow passage to receive landing parts on each of the removable tools to be described. Beneath these recesses and intermediate its ends, the housing is provided with openings or ports 59 therethrough communicating the housing flow passage with the exterior of the housing above the packer 54.

An additional opening 60 through the housing intersects the flow passage thereof at a level below the intersection therewith of openings 59 as well as beneath the packer 54 with the housing exterior beneath said packer. An annular conduit 61 within the housing and flow passage therethrough by-passes the opening 60, in a manner to be explained more fully hereinafter, and communicates with the flow passage at 62 and 63 above and below, respectively, the by-passed opening 60, the upper communication 62 being intermediate openings 59 and 60 and beneath packer 54.

The removable tool shown landed with the housing 56 in FIG. 1 is for simultaneously producing the two zones in cross-over fashion and is designated in its entirety by the numeral 64. The tool shown in FIG. 2 provides for regular or conventional flow simultaneously from the two zones and is designated by the numeral 65, while the tool in FIG. 3 is operable to permit circulation in the lower zone and as well as to perform a squeeze job on the lower formation. Such a tool is generally known as an extension hanger and is designated herein by the numeral 66.

Each of the above tools is selectively landable within and removable from the housing 56 in a similar manner. That is, each is provided with a fishing neck 67 about its upper end whereby it may be raised or lowered within the tubing and housing by wire line or similar means. As well, each tool is provided with landing parts shown diagrammatically at 68 and 68*a* and to be more fully described hereinafter, which are of a type expandable within the flow passage recesses 58 and 58*a*, respectively, for positioning the tool within the housing. Still further, each tool is provided with an axial flow passage communicating through the landing parts and fishing neck with an open upper end of the tool.

The cross-over tool 64 comprises a tubular mandrel 70 in which the flow passage 71 therein is normally closed at its lower end by a valve 72 of a type which may be selectively opened to permit flow therethrough and the pressures within the separate conduits above and below to be equalized. Carried peripherally of the mandrel are pressure type packing elements 73 to 76, inclusive. As can be seen from FIG. 1, the packing elements 73 are carried on a level above landing parts 68*a* for sealing engagement with a surface on the housing flow passage above recess 58*a*, and serving further as protection for these parts from debris in the tubing thereabove.

The packing elements 74, 75 and 76 are carried, respectively, on levels for sealing engagement with the housing above the upper opening 59, intermediate upper and lower openings 59 and 60, and below lower opening 60. With the lower housing opening 60 and the annular passage between the mandrel and flow passage 57 above the upper opening 59 thus packed off, it can be seen that flow from the lower formation is directed, as shown by the solid arrows of FIG. 1, from the lower end of the housing 56, through the by-pass conduit 61 and annular passage between the mandrel 70 and housing flow passage 57, into the upper housing opening 59, from which it passes upwardly out of the well through the tubing-casing annulus.

The mandrel 70 is provided with ports 77 therethrough communicating the flow passage 71 therein with its exterior intermediate the packing elements 75 and 76. Thus, as shown by the broken arrows of FIG. 1, flow from the upper formation is directed through the packed off housing opening 60, through the mandrel ports 77 and flow passage 71, and into the upper end of the housing, from which it passes upwardly out of the well through the tubing 50.

The regular flow tool 65 (FIG. 2) comprises a tubular mandrel 78 somewhat longer than the above-described cross-over tool mandrel and has a flow passage 79 which extends therethrough from one end to the other. This mandrel is provided toward its upper end with packing elements 80 and 81 corresponding, respectively, to the elements 73 and 74 on the cross-over tool and on a level sealable with the housing above landing parts 68*a* and intermediate said parts and the upper housing opening 59. As well, packing elements 82 are carried on the lower end of the mandrel for sealing engagement with the housing below the lower by-pass conduit communication 63, and the mandrel is imperforate intermediate the packing elements 81 and 82. In this manner, the by-pass conduit 61 as well as both housing openings 59 and 60 are packed off such that flow from the lower formation is directed, as shown by solid arrows in FIG. 2 from the lower end of the housing, through the mandrel flow passage 79, and into the upper end of the housing, from which it passes out of the well through the tubing 50. It will further be seen from the broken arrows in FIG. 2 that flow from the upper formation enters the housing through lower opening 60, from which it is directed upwardly through the annular passage between the mandrel 79 and housing flow passage into the upper housing opening 59 and out of the well through the tubing-casing annulus.

The extension hanger 66 of FIG. 3 serves in one respect to increase the effective length of the tubing and permit flow therein for circulating and performing certain work-over operations beneath packer 55, such as removal of sand or other debris from the well bore. The tool comprises a mandrel 83 having a flow passage 84 extending therethrough from one end to the other and carrying packing elements 85 and 86 above and below, respectively, the landing parts 68*a*, the latter of said elements being on a level to sealingly engage the housing below said parts and above the upper opening 59. Additionally, the mandrel 83 carries packing elements 87 and 88 on levels for sealing engagement with the housing intermediate the opening 60 and each of by-pass communications 62 and 63. Thus, at least as to location of the packing elements thereon, the extension hanger is similar to cross-over tool 64. However, with the mandrel being imperforate intermediate the packing elements 86 and 88 and the flow passage 84 extending therethrough, two separate flow paths are established within the housing, one of which communicates the upper housing opening 59 with the lower end of the housing through the annular passage between the mandrel and housing and the by-pass conduit 61, and the other of which communicates the lower end of the housing with the upper end thereof through the mandrel flow passage 84. Thus, as shown by the arrows in FIG. 3, fluid may be circulated down through the tubing-casing annulus, into the casing beneath packer 55, and up through the tubing 50.

The extension hanger 66 shown herein may be provided with a check valve, such as the one designated in its entirety by the numeral 89 and having its valve member disposed in the annular flow passage, which is operable to provide for the indicated circulation by permitting flow downwardly htrough said annular passage. However, upon reversal of the flow paths, the valve will prevent flow upwardly therethrough such that squeeze pressures may be held on the lower formation, for a purpose well known in the art, without subjecting the casing above packer 55 to such pressure.

Of course, along this same line and as also known in the art, upon removal of the extension hanger, a perforating device may then be lowered through the tubing and adjacent a portion of the casing to be perforated to produce from the same or a new formation below packer 55.

The packer 54 is preferably of a retrievable type carried by each of the tools of the FIGS. 1 to 3 embodiment. The packing elements carried by the various tools are of a size for movement through as well as initial engagement and sealing with the surface in the housing flow passage to be packed off. For this purpose, these surfaces are specially finished and are therefore designated in the description and claims as "sealing surfaces."

The second embodiment of the device of the present invention, which is shown schematically in FIGS. 4 to 8, inclusive, is provided with a tubular housing 90 which is similar to the housing 56 of the first-described embodiment in that it is provided with a flow passage 91 extending continuously therethrough from one end to the other as well as landing recesses 92 and 92*a* toward the upper end thereof. Further, openings are provided through the housing 90 communicating the flow passage therethrough with the exterior of the housing above and below the packer 54. The first of these openings 93 which communicates with the housing exterior above the packer intersects the flow passage on a level above the flow passage intersection of openings 94 communicating with the housing exterior below the packer 54.

One difference between the housing 90 and the housing 56 of the first-described device is that the lower openings 94 therethrough are actually ports similar to the upper openings 93, rather than openings through a by-pass conduit, such as the conduit 61 of said first-described embodiment. As will be described hereinafter, in this second embodiment the by-pass, when required, is provided within the removable tool itself. An advantage of this arrangement is that the elimination of the by-pass conduit in the lower end of the housing permits the outer diameter thereof to be substantially uniform and removable through certain non-retrievable type of packers. As a practical matter, it is found that many in the industry prefer a packer of the non-retrievable type, examples of which are well known to those skilled in the art. In such a case, the packer 54 is first lowered within and set in the casing by a special setting tool and the tubing and housing 90 subsequently lowered into the casing and through the packer 54 for sealing engagement therewith so as to be packed off as shown in the drawings.

Figure 4:
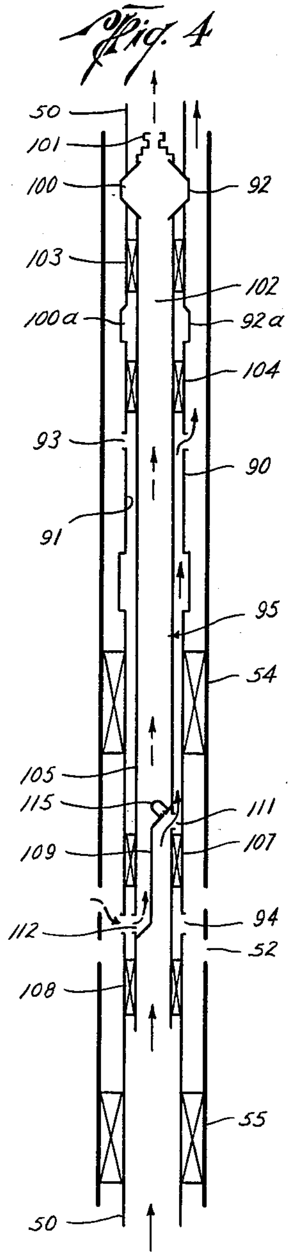
Figure 5:
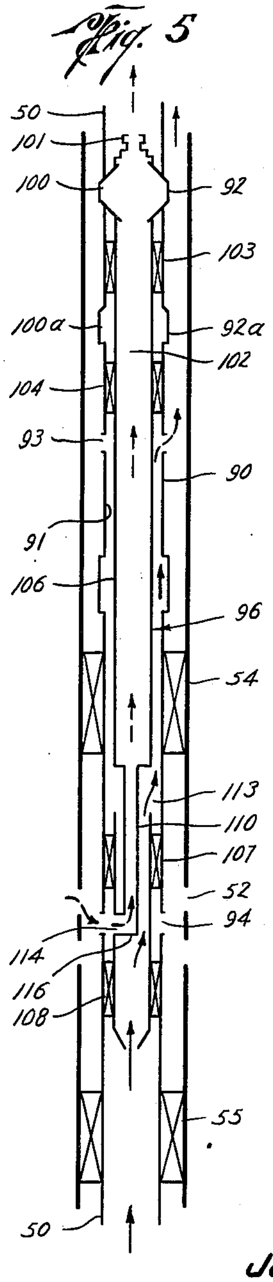
Figure 6:
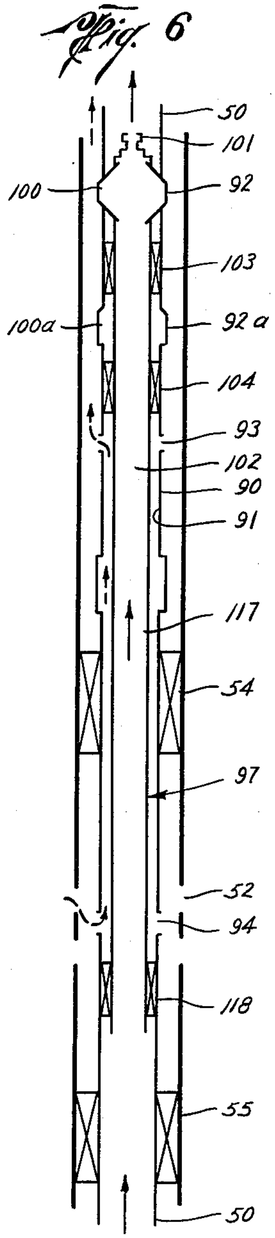
Figure 7:
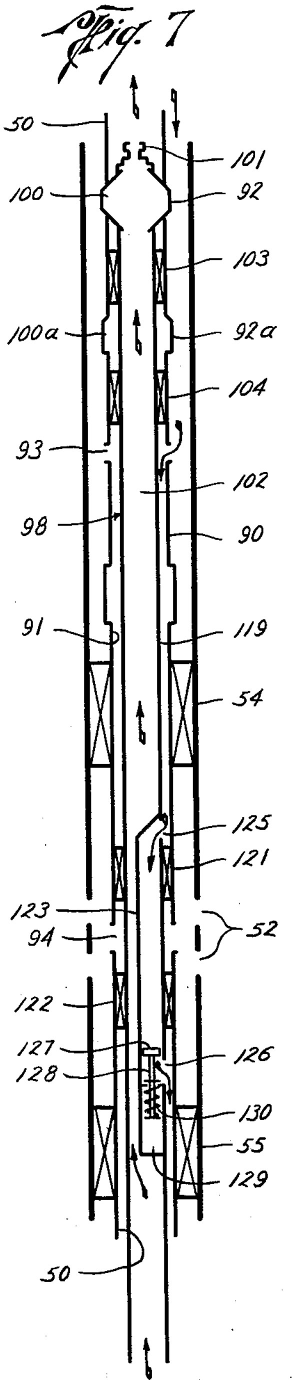
Figure 8:
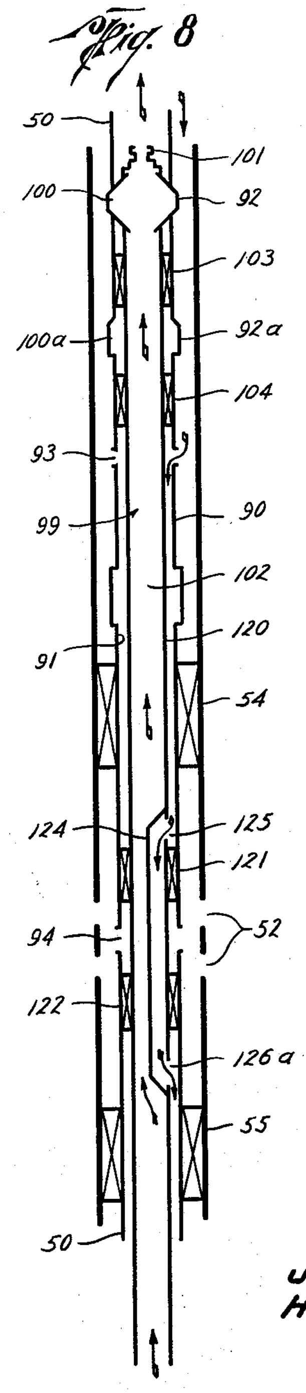

FIGS. 4 and 5 illustrate alternative types of cross-over tools usable in connection with this embodiment of the invention and designated, respectively, by the numerals 95 and 96. The removable tool landed in the housing 90 as shown in FIG. 6 is a regular flow tool designated in its entirety by the numeral 97 and, of course, usable in conjunction with either of the alternative types of cross-over tools shown in FIGS. 4 and 5. Finally, FIGS. 7 and 8 illustrate two alternative types of extension hangers 98 and 99, respectively, which are also usable with either type of cross-over tool. Similarly to the first described embodiment of this invention, each of the aforementioned tools is provided with landing parts 100 and 100*a* cooperable, respectively, with recesses 92 and 92*a* in the flow passage of the housing.

Further, the mandrel of each removable tool is provided with a fishing neck 101 at its upper end having an opening therethrough communicating with a flow passage 102 within the mandrel and extending through the landing parts thereof. Still further, each of said tool mandrels carries packing elements 103 and 104 about its periphery intermediate the landing parts 100 and 100*a* and below the last-named landing parts, respectively, said last-named packing element 104 being carried on a level for sealing engagement with the housing above the upper openings 93.

Each of the mandrels 105 (FIG. 4) and 106 (FIG. 5) of the cross-over tools 95 and 96, respectively, is provided with additional packing elements 107 and 108 carried on levels for sealing engagement with the housing above and below, respectively, the lower openings 94 therethrough, the uppermost of these additional packing elements also being intermediate the housing openings 93 and 94. As shown in FIGS. 4 and 5, the lower end of each of the mandrels 105 and 106 is open and means are provided within the mandrel flow passage 102 separating the same into two conduits, the uppermost of which communicates with the upper end of the mandrel flow passage and the lower of which communicates with the lower end of said mandrel flow passage. This conduit forming means comprises walls designated by the numeral 109 in mandrel 105 and 110 in mandrel 106.

Openings are provided through the mandrels 105 and 106 communicating the above conduits therein with the exterior of said mandrels at two levels therealong whereby by-passes are formed corresponding to the by-pass conduit built into the housing in the first-described embodiment. As shown in FIG. 4, a port 111 communicates the lower conduit in the mandrel flow passage with the exterior of said mandrel intermediate the packing elements 104 and 107, while a port 112 on a level below the port 111 communicates the uppermost conduit in the mandrel flow passage with the mandrel exterior intermediate packings 107 and 108. In the cross-over tool of FIG. 5, an upper opening corresponding to port 111 is shown at 113 communicating the lower conduit in the mandrel flow passage with the exterior of mandrel 106 between the packing elements 104 and 107. A lower opening 114 through the mandrel 106 communicates the upper conduit in the mandrel flow passage with the exterior thereof between packings 107 and 108.

From the foregoing, and with reference to the solid arrows of FIGS. 4 and 5, it can be seen that flow from the lower formation is directed from the lower end of the tubular housing 90 through the lower conduit in the mandrel flow passage, out the openings 111 and 113 in the cross-over tools 95 and 96, respectively, up the annular passage between the mandrels of these tools and the housing flow passage, and into the upper housing ports 93, from which said flow passes upwardly and out of the well through the tubing-casing annulus. On the other hand, flow from the upper formation is directed through the lower housing openings 94 and mandrel openings 112 and 114 into the upper conduit of the mandrel flow passage 102 and out of the well through the upper end of the housing and the tubing string 50.

For a purpose similar to the valve 72 of FIG. 1, the cross-over tools of each type shown in FIGS. 4 and 5 are provided with frangible elements capable upon being broken of communicating one of the above-described flow paths with the other. For this purpose, there is indicated in FIG. 4 a frangible element 115 in the upper portion of wall 109, while another frangible element is provided in a location indicated by the numeral 116 in the lower portion of wall 110 of the cross-over tool 96. Each of these frangible elements 115 and 116 is in a position to be broken by a suitable tool lowered through the tubing string and into the cross-over tool.

Turning now to the regular flow tool 97 for this embodiment of the invention, it can be seen from FIG. 6 that it corresponds very closely to the regular flow tool 65 of the first-described embodiment and shown in FIG. 2. That is, the tool mandrel 117 carries packing elements 118 on a level for sealing engagement with surfaces on the housing flow passage beneath lower openings 94 therethrough. However, it will be noted that these last-mentioned packing elements are sealable closer to such openings inasmuch as it is not necessary to extend the spacer pipe or mandrel a distance in the tubular housing 90 sufficient to pack off by-pass conduit communications with the housing, as is the case in connection with the regular flow tool of the embodiment shown in FIGS. 1 to 3. The principle of operation is the same, however, as the mandrel flow passage 10 is open from end to end and the mandrel 117 is imperforate between packing elements 104 and 118 such that flow from the lower formation, indicated by the solid arrows in FIG. 6 is directed from the lower end of the housing through the mandrel flow passage 102 and into the upper end of the housing, from which it passes upwardly and out of the well through the tubing 50. On the other hand, and again similarly to the first embodiment, flow from the upper formation enters the tubular housing 90 through lower openings 94 and is directed upwardly through the annular passage between the mandrel and housing into the upper ports 93, from which said flow passes upwardly and out of the well through the tubing-casing annulus.

Turning now to the two types 98 and 99 of extension hanger shown in FIGS. 7 and 8, respectively, for this embodiment of the invention, it can be seen that the mandrels 119 and 120 thereof are landed and packed off about their upper ends within the flow passage of the housing 90 similarly to the cross-over and regular flow tools of FIGS. 4 to 6. Each of these mandrels is open at opposite ends and the flow passage 102 therein extends from one end thereof to the other. As well, it will be understood that the packing elements 104 define an annular flow passage therebelow between the mandrels and housing and communicating with the upper housing ports 93.

Similarly to the cross-over tools of FIGS. 4 and 5, each of the extension hanger mandrels 119 and 120 is provided with packing elements 121 and 122 at levels therealong for sealing engagement in landed position with the housing above and below, respectively, the lower housing openings 94, the upper of these packing elements 121 being disposed intermediate the lower openings 94 and upper openings 93. Formed within each of the mandrels 119 and 120 is a conduit separate from the flow passage 102 extending therethrough and communicating at 125 with the mandrel exterior intermediate the packing elements 121 and 104 as well as at 126 (FIG. 7) and **126*a* (FIG. 8) below the lowermost packing elements 122. As shown in FIG. 7, this separate conduit is formed by a wall 123 extending longitudinally through and dividing the mandrel flow passage, while in the extension hanger shown in FIG. 8, this separate conduit is formed by a wall 124**. Each of these separate conduits provides a by-pass about the packed off lower housing openings.

Thus, as can be seen from each of FIGS. 7 and 8 and the arrows thereon, fluid flow downwardly in the tubing-casing annulus will be directed into the upper housing openings 93 and downwardly through the annular flow passage between the mandrels 119 and 120 and the housing 91, from which passage the flow is directed downwardly through the afore-mentioned separate conduits defined by the walls 123 and 124 for communication with the lower end of the housing and extension hanger mandrel. From the lower end of this mandrel, the circulation of fluid is upwardly through the imperforate mandrels 119 and 120 past the walls 123 and 124 and into the tubing 50 through the open upper end of the mandrel. In this manner, as in the case of the extension hanger 66 of FIG. 3, there is established a continuous circulation of fluid within the well bore beneath the packer 55. It will be noted that in the extension hanger 99 of FIG. 8, the direction of circulation could be reversed—that is, down the tubing and up the tubing-casing annulus—inasmuch as there is no valve means, similar to the valve 89 of FIG. 3, incorporated therewith. This latter statement may also apply to the type of extension hanger disclosed in FIG. 7 although, as will be explained more fully hereinafter, a valve for performing squeeze jobs on the lower formation may be provided if desired.

There is shown in the lower portion of the separate by-pass conduit defined by the wall 123 of the extension hanger 98 in FIG. 7, a diagrammatic illustration of the novel packing testing means of the present invention. Although reference is had to the description to follow for a detailed discussion of the construction and operation of this packing testing means, it can be seen from FIG. 7 that this packing testing means includes a valve member 127 operable within the separate conduit above the communication 126. This valve member 127 is mounted on a stem 128 received in a chamber 129 formed in a lower portion of the wall 123. A coil spring 130 is provided to urge the valve member 127 out of position within the separate conduit above the communication 126 to permit free passage of fluid through the conduit between the communications 125 and 126. However, a shear pin connects the valve stem 128 to the mandrel in such a way as to retain the valve member 127 in flow blocking position.

This mechanism permits a testing of the seal between the packing elements 121 and 122; housing in a manner to be described hereinafter, up to certain predetermined pressures. After testing has been completed, however, the pressure within the separate conduit may be increased sufficiently to shear the pin, whereby the valve member 127 is urged downwardly by the coil spring 130 to permit the separate conduit to be used as a by-pass for circulating purposes. A modification, also to be described hereinafter, renders such packing testing means also usable as a check valve similar to the valve 89 of FIG. 3 for the purpose of permitting squeeze jobs to be performed on the lower formation when the flow paths are reversed.

Figure 14:
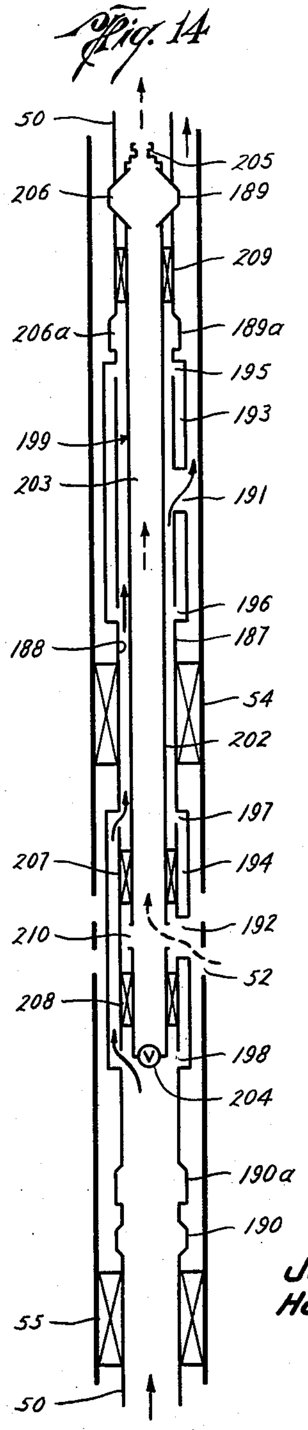
Figure 15:
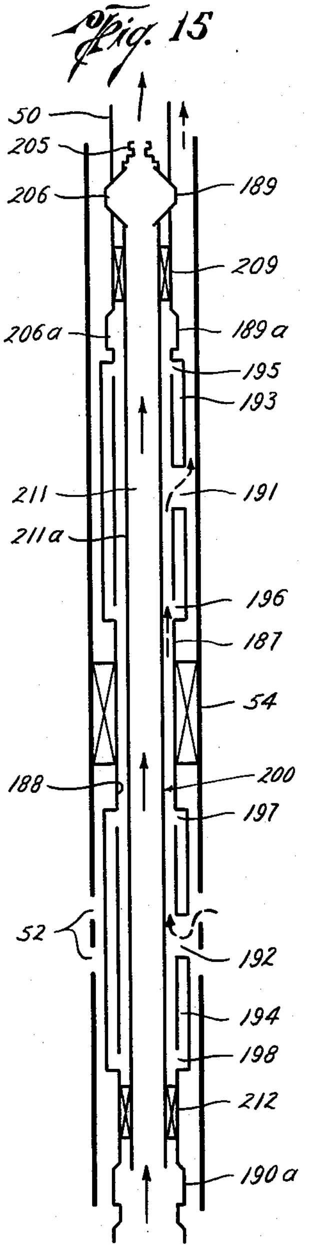

The several embodiments of the improved selective cross-over device of the present invention shown in FIGS. 9 to 16, inclusive, are more similar as a group to the earlier device shown in the afore-mentioned copending application inasmuch as the opening in the tubular housing of each communicating with the housing exterior above the upper packer is in effect by-passed by a conduit formed in such housing. As will be understood from the description to follow, however, the similarity ends here as in the present device a full opening is provided through the tubular housing whereby production and work-over tools may be passed therethrough. Because of this difference, the by-pass within the tubular housings of the embodiments of the present invention is constructed in a manner different from the by-pass conduit of the afore-mentioned earlier device. It will also be noted that of the embodiments shown in FIGS. 9 to 16, only that shown in FIGS. 14 to 16 is provided with a work-over tool in the form of an extension hanger. In the other tool forms or embodiments shown in FIGS. 9 to 13, however, there is, as afore-mentioned, a full opening through the tubular housing such that production tools may be passed therethrough.

Figure 9:
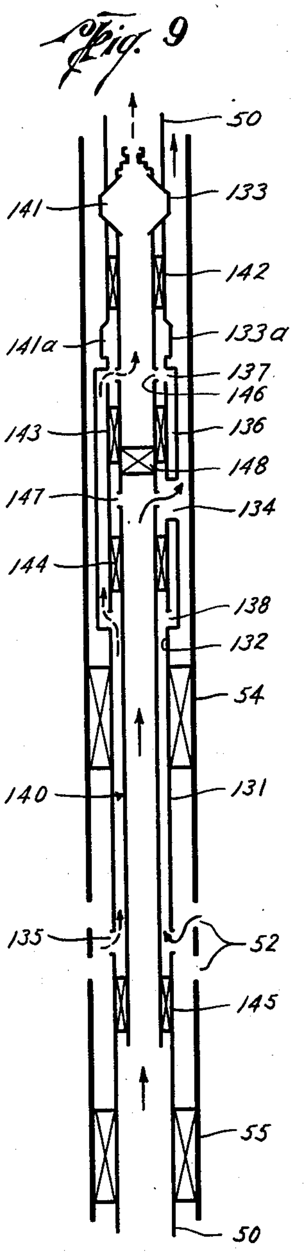
Figure 10:
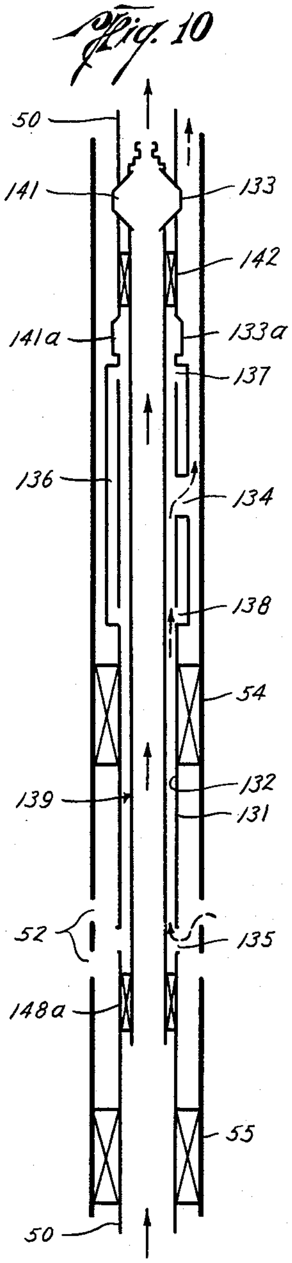

Noting first the embodiment shown in FIGS. 9 and 10, it can be seen that a tubular housing 131 is packed off similarly to the previously described embodiments and is further provided with a flow passage 132 extending axially therethrough from one open end to the other and having landing recesses 133 and **133*a* formed on the full opening therethrough. In addition to the foregoing, the tubular housing 131 is provided with a first opening 134 communicating the interior or flow passage 132** of the tubular housing with the exterior thereof above the packer 54 at a level above the flow passage communication of a second opening 135 through the tubular housing and communicating exteriorly thereof below the packer 54. As previously mentioned, the tubular housing is provided with a by-pass conduit by-passing the upper openings 134. This conduit is indicated by the numeral 136 in FIGS. 9 and 10 and communicates with the housing flow passage at 137 and 138 intermediate said by-passed openings and the landing parts and openings 135, respectively.

Each of the regular flow tool 139 (FIG. 10) and cross-over tool 140 (FIG. 9) comprises a mandrel having a flow passage therein open at opposite ends and landing parts 141 and 141*a* for cooperation, respectively, with the recesses 133 and 133*a* in the housing flow passage. As well, each mandrel carries a packing element 142 for sealing engagement with the housing intermediate the recesses 133 and 133*a*. The mandrel for the cross-over tool 140 also carries packing elements 143 and 144 on levels for sealing engagement with the housing above and below, respectively, the upper openings 134 therethrough. It will also be seen from FIG. 9 that the upper of these packing elements 143 is sealable intermediate the opening 134 and upper by-pass conduit communication 137, while the lower is sealable between such upper housing opening and the lower conduit communication 138. Thus, it can be seen from FIG. 9 that the annular passage between the tool mandrel and the housing is communicated with the lower housing openings 135 and by-pass conduit 136. Such communication is accomplished by the effective packing off of the upper opening 134 through the tubular housing.

Additional packing elements 145 are carried on a lower level on the mandred for sealing engagement with the housing beneath the lower openings 135 and ports 146 and 147 are provided through the cross-over tool mandrel at levels thereon intermediate the packing elements 142 and 143 in the case of ports 146, and intermediate the packing elements 143 and 144 in the case of ports 147. Additionally, the mandrel flow passage is normally blocked as indicated at 148 intermediate the afore-mentioned ports 146 and 147.

Thus, with the mandrel between the packing elements 144 and 145 being imperforate, flow from the lower formation is directed upwardly through the lower end of the housing into the open lower end of the mandrel flow passage and into the ports 147 through the mandrel and openings 134 through the tubular housing 131. From the exterior of the housing, the flow from the lower production zone passes upwardly in the tubing-casing annulus and out of the well. Flow from the upper formation, on the other hand, is directed from the lower housing openings 135 upwardly through the annular passage between the mandrel and housing, through the by-pass conduit 136 past the upper housing opening 134, and into the upper open end of the mandrel above the blocking means 148, from which end the flow passes upwardly through the tubing string 50 and out of the well.

Figure 17A:
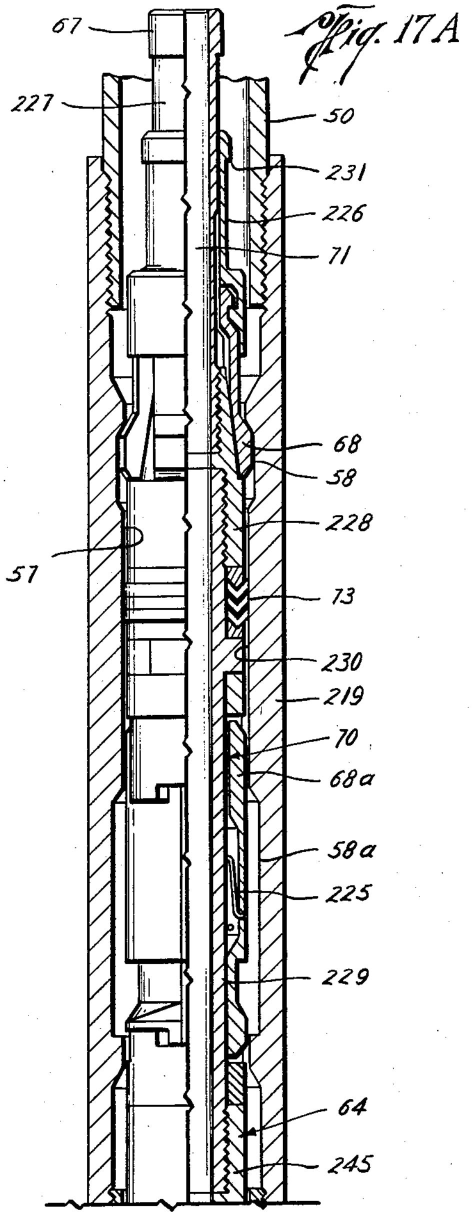
Figure 17B:
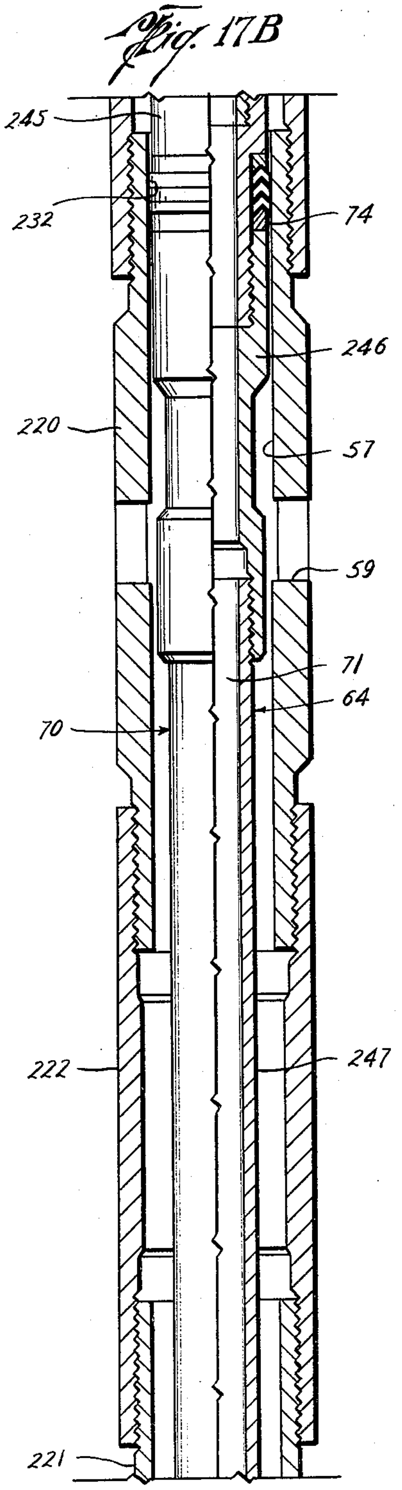
Figure 17C:
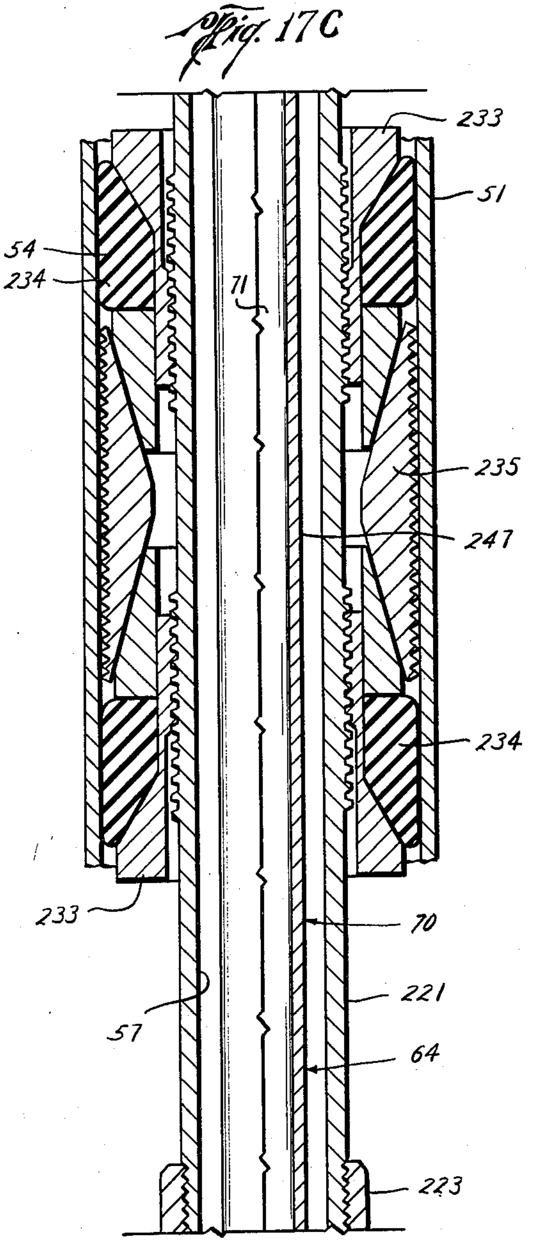
Figures 17D, 18:
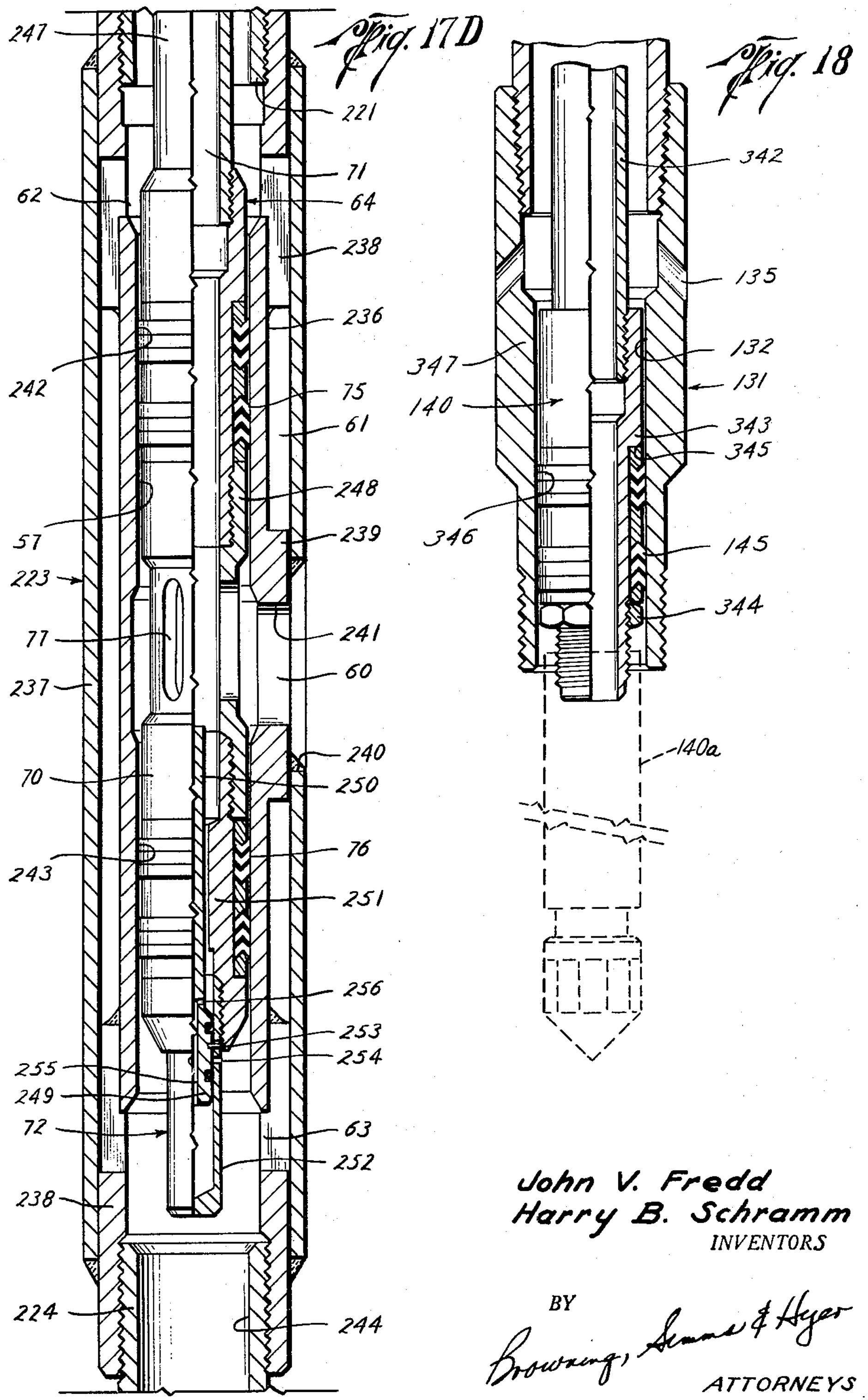
FIG. 18 is another detailed view of the lower end of one of the removable tools carrying packing elements for sealing engagement with a tubular housing, and particularly the lower end of such tools as shown in FIGS. 9 and 10.

As an example of a production tool runable through the housing, a safety valve 140*a* is indicated in broken lines in FIG. 18 as being attached to the lower end of the cross-over tool 140 of FIG. 9. The details of such a valve are shown on page 3994 of the afore-mentioned Catalog of Otis Pressure Control, Inc. From the foregoing description, it will be understood that with another safety valve in the tubing string 50 above the housing 131, flow from both formations may be suitably controlled in a section of the well tubing.

As shown in FIG. 10, the flow passage in the mandrel of the regular flow tool 139 extends continuously therethrough from one end thereof to the other. The only packing elements carried by this mandrel in addition to the elements 142 are shown at 148*a* on a level of the mandrel for sealing engagement with the housing beneath the openings 135 therethrough. Intermediate the packing elements 142 and 148*a*, however, the regular flow tool mandrel is imperforate such that flow from the lower formation, as indicated by the solid arrows in FIG. 10, is directed upwardly from the lower end of the housing 131 into the continuous flow passage through the mandrel and out the upper end thereof as well as the upper end of the housing, from which end it passes through the tubing string out of the well. Flow from the upper formation, on the other hand, is indicated by the broken arrows of FIG. 10 and enters the tubular housing 131 through the openings 135 and from there is directed upwardly through the annular passage between the mandrel and housing into the housing opening 134, from which the flow is upwardly through the tubing-casing annulus and out of the well.

Figure 11:
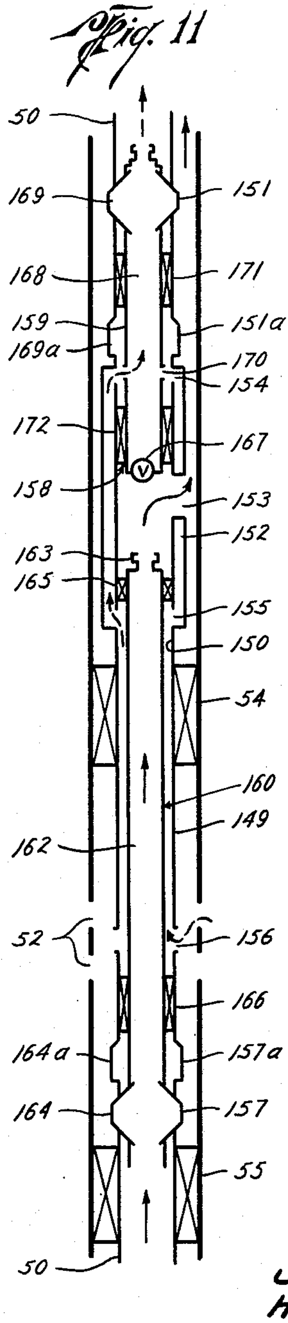
Figure 12:
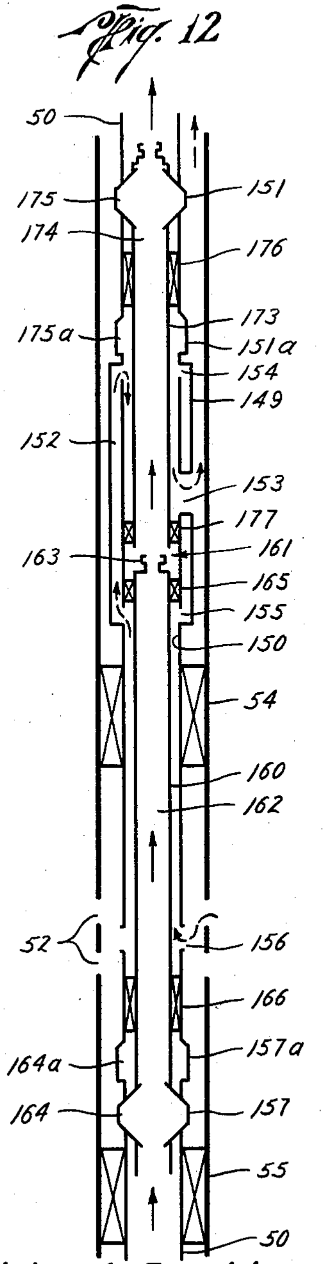

The embodiment shown in FIGS. 11 to 13, inclusive, is in many respects similar to that just described, but differs therefrom in that the flow directing tools used in connection therewith are formed in separable parts. More particularly, such tools are formed of one part common to each of the regular and cross-over tools which may be left in landed position within the tubular housing while switching between cross-over and regular flow is enabled by the selective removal and landing of the other part of such tools. In view of the foregoing, it will be understood that two means of the general type described in connection with the foregoing embodiments of the invention must be provided for landing within the housing flow passage, one for the lower common part of each tool and the other for the switchable part thereof.

Referring now to the details of this embodiment, it will be seen that the tubular housing 149 thereof may be identical with the housing 131 of the embodiment of FIGS. 9 and 10 as far as its portion above packer 54 is concerned. Thus, this housing includes a flow passage 150 having a full opening extending therethrough from one end to the other, as well as landing recesses 151 and 151*a*. Additionally, the tubular housing 149 is provided with a by-pass conduit 152 about an upper opening 153 therethrough which communicates the housing flow passage 150 with the housing exterior above the packer 54. The communications of the conduit 152 by-passing the opening 153 are shown at 154 and 155 above and below, respectively, the flow passage communication of the housing opening 153, the uppermost 154 of such communications being below the landing recesses.

Lower openings or ports 156 through the tubular housing connect the flow passage therethrough on a level beneath the opening 153 with the housing exterior beneath the packer 54 and conduit communication 155. At a distance beneath the openings 156, the housing flow passage is provided with landing recesses 157 and 157*a*. As previously mentioned, it will now be apparent that the principal difference between the tubular housing 149 of the embodiment of FIGS. 11 to 13 and the tubular housing 131 of the embodiment of FIGS. 9 and 10 is that the former is provided with the additional landing means such that the common part of each of the flow directing tools may be landed separately from the switching part thereof.

Referring first to the cross-over tool designated in its entirety by the numeral 158 in FIG. 11, it can be seen that this tool comprises an upper mandrel 159 and a lower mandrel 160. Inasmuch as the lower mandrel 160 is common to the regular flow tool 161 of FIG. 12 as well as the cross-over tool 158, it will be first-described. This mandrel 160 is provided with a flow passage 162 extending continuously therethrough from one end to the other as well as a fishing neck 163 about its upper end whereby it may be separately handled by wire line or other suitable means and landing parts 164 and 164*a* cooperable for landing said mandrel within recesses 157 and 157*a*, respectively, of the tubular housing 149. With the mandrel 160 landed as shown in FIGS. 11 and 12, packing elements 165 are sealably engageable with the housing 150 intermediate the upper opening 153 therethrough and the lower by-pass conduit communication 155. Additional packing elements 166 are carried by the mandrel 160 on a level for sealing engagement with the housing intermediate the lower openings 156 therethrough and the landing recesses 157 and 157a. It will be understood that the above-described arrangement directs flow, as indicated by the solid arrows, from the lower formation through and out the upper end of the mandrel flow passage 162. On the other land, as shown by broken lines, flow from the upper formation enters the tubular housing 149 through opening 156 from which it is directed upwardly through the annular flow passage between the imperforate mandrel 160 and the housing into the by-pass conduit 152.

Relating back to the mandrel 159 of FIG. 11 which forms the upper part of the cross-over tool 158, and particularly the part thereof which is selectively removable and landable for switching over to cross-over flow, it can be seen that this mandrel is provided with a valve 167 normally closing the flow passage 168 therethrough similarly to valve 72 of FIG. 1, which flow passage is open at its upper end. As well, this mandrel 159 is provided with landing parts 169 and 169a cooperable with recesses 151 and 151a, respectively, for landing such mandrel. Further, ports 170 are provided through the mandrel communicating its flow passage 168 with the exterior thereof, and packing elements 171 and 172 are carried on the mandrel 159 above and below, respectively, the ports 170. More particularly, the packing elements 171 are disposed intermediate the landing parts and the ports 170, and packing elements 172 are disposed between said openings 170 and the valve 167 at the lower end of the mandrel. Thus, as can be seen from FIG. 11, the packing elements 171 are sealably engageable with the housing above conduit communications 154, while the packing elements 172 are sealably engageable with the housing intermediate said communications 154 and the upper housing opening 153. Thus, it will be understood that flow from the lower formation is directed from above the mandrel flow passage 162 into the upper housing opening 153, from which it passes upwardly out of the well through the tubing-casing annulus. On the other hand, it can also be seen that the flow from the upper formation, indicated by the broken arrows of FIG. 11, is directed from the by-pass conduit 152 into the flow passage 168 through the upper mandrel 159 through upper conduit communications 154 and ports 170 in the mandrel 159. Of course, this flow from the upper formation passes out of the well through the upper end of the mandrel flow passage 168 and tubing string 50.

The upper switchable part of the regular flow tool 161 (FIG. 12) of this embodiment comprises a mandrel 173 having a flow passage 174 extending continuously therethrough from one end to the other. Similarly to the mandrel 159 of FIG. 11, the mandrel 173 is provided with a fishing neck at its upper end and landing parts 175 and 175a cooperable, respectively, with recesses 151 and 151a of the housing flow passage. As well, this upper mandrel is provided with packing elements 176 intermediate its landing parts and sealingly engageable with the housing above the upper conduit communications 154. It will be noted from FIG. 12, however, that the mandrel 173 is somewhat longer than the switchable mandrel 159 of the cross-over tool shown in FIG. 11 such that packing elements 177 may be carried thereby on a level for sealing engagement with the housing intermediate the upper housing opening 153 and lower conduit communications 155. Thus, it will be understood that with the mandrel 173 being imperforate between the packing elements 176 and 177, flow from the lower formation, as indicated by the solid arrows, is directed from the flow passage 162 of the lower mandrel into the flow passage 174 through the upper mandrel and out the upper end thereof into the tubing string, from which it passes upwardly out of the well. Flow from the upper formation is directed from the by-pass conduit 152 through upper conduit communications 154 into upper housing opening 153, from which opening said flow passes upwardly out of the well through the tubing-casing annulus.

From the foregoing, it will be apparent that an advantage of this particular embodiment of this invention over that disclosed in FIGS. 9 and 10 lies in the fact that the lower mandrel 160 may remain landed within the housing flow passage while switching between cross-over and regular flow is obtained by the selective use of the upper mandrel part of each tool. As shown, the upper part of each tool is of relatively short length inasmuch as it does not span the upper packer 54 and lower opening 156 through the housing. Thus, the lower mandrel 160 provides what may be called a stationary spacer pipe through the portion of the housing carrying the packer 54, it being understood that the term "stationary" is used to designate its positions during the switching operation and not as a permanent installation inasmuch as this lower mandrel 160 may be removed to permit production tools to be passed through the tubular housing and, in fact, such removal is one of the many advantages of the present invention.

FIG. 13 is illustrative of another use to which this particular embodiment of the invention may be put. Such use is to "hydrafrac" or "Sandfrac" the upper formation by means of separable mandrels selectively disposable within the housing flow passage for directing flow downwardly through the tubing string 50 and into the upper formation. This process is so well known in the art that it need not be described herein. A detailed description thereof may be found, for example, on page 2244 of the 1952–53 issue of the Composite Catalog of Oil Field and Pipe Line Equipment. It will be noted in this connection that the lower formation may be subjected to this same process with the use of the regular flow tool of FIG. 12, or other of the regular flow tools shown herein. That is, suitable fluid may be passed downwardly through the tubing into the lower formation without having to pass through the annular conduits.

These separate mandrels include an upper mandrel 178 having a flow passage 179 extending continuously therethrough from one end to the other, a fishing neck about its upper end, and landing parts 180 and 180a cooperable, respectively, with recesses 151 and 151a in the housing flow passage. As well, this mandrel 178 is provided with packing elements 181 and 182, the former being carried by the mandrel between landing parts 180 and 180a and sealingly engageable with the housing above upper conduit communications 154, and the latter being carried on a level of the mandrel for sealing engagement with the housing intermediate the lower conduit communications 155 and housing openings 156. With the mandrel 178 being imperforate between packing elements 182 and 181, it will be understood that the upper housing opening 153 is effectively packed off.

The lower mandrel or testing tool 183 is provided with landing parts 184 and 184a cooperable, respectively, with housing recesses 157 and 157a, as well as packing elements 185 carried thereby on a level for sealing engagement with the housing to form a plug therein. That is, as shown in FIG. 13, the upper fishing neck 186 of the mandrel 183 is closed to passage therethrough. More particularly, with the mandrel 183 landed in the lowermost landing recesses of the tubular housing 149, the packing elements 185 are carried on the mandrel for sealing engagement with the housing intermediate the lower housing openings 156 and recesses 157a in the flow passage of the housing. Thus, suitable fluid may be directed downwardly through the tubing and housing flow passage 150 and outwardly of the housing through the lower openings 156 to "Hydrafac" the upper formation.

The final embodiments of the improved selective cross-over device of the present invention, shown schematically in FIGS. 14 to 16, inclusive, is in many respects similar to the last two described embodiments in FIGS. 9 to 13, but is further modified so as to provide for an extension hanger for work-over operations to be performed on the lower formation. Broadly, the accommodation of this embodiment for work-over operations is enabled by the provision of a conduit in the tubular housing by-passing the lower as well as the upper housing openings.

Turning now to a detailed description of the schematic representation of this embodiment, it can be seen that the tubular housing 187 of the device is provided with a flow passage 188 extending therethrough from one end to the other. As well, landing recesses 189 and 189*a* are provided in the full opening of the flow passage toward its upper end and additional landing recesses may be provided adjacent the lower end thereof at 190 and 190*a* to permit landing of suitable tools or well control devices, such as a tool similar to mandrel 183 of FIG. 13 for "Hydrafac" of the upper formation. An opening 191 is provided through the housing communicating its flow passage with the exterior thereof above the packer 54, and another opening 192 is provided through the housing communicating with the flow passage on a level beneath the communication therewith of opening 191 and further communicating with the exterior of the housing beneath packer 54.

As previously mentioned, conduits are provided in the housing for by-passing each of these openings, the conduit for by-passing the upper opening being indicated by the numeral 193 and that for by-passing the lower opening being indicated by the numeral 194. The conduit 193 communicates with the housing flow passage above and below the communication therewith of opening 191 at 195 and 196, respectively, while the conduit 194 communicates with the housing flow passage at 197 and 198 above and below, respectively, the flow passage communication of lower housing opening 192. As can be seen from FIGS. 14 to 16, the conduits 193 and 194 are non-overlapping such that the conduit communications 197 is more nearly adjacent the opening 192 it by-passes than the lower conduit communication 196 for the upper conduit 191. It can also be seen that the conduit communications 196 and 197 are disposed at opposite sides of the packer 54 such that the housing portion extending therethrough may be of single wall construction similarly to the above-described embodiments.

FIG. 14 shows a cross-over tool 199 landed in place within the tubular housing, FIG. 15 a regular flow tool 200 therein, and FIG. 16 an extension hanger 201 therein. Turning first to the cross-over tool 199, there is provided a mandrel 202 having a flow passage 203 therein open at its upper end but normally closed at its lower end by a valve 204 similar to valve 72 of FIG. 1. At its open upper end, the mandrel 202 is provided with a fishing neck 205 and landing parts 206 and 206*a* cooperable, respectively, with recesses 189 and 189*a* in the housing flow passage.

Toward its lower end, the mandrel 203 is provided with packing elements 207 and 208 carried on levels for sealing engagement with the housing intermediate the lower housing opening 192 and each of the conduit communications 197 and 198, respectively. With the mandrel 202 being imperforate between packing elements 207 and additional packing elements 209 carried thereby for sealing engagement with the housing above the uppermost conduit communication 195, it will be understood that flow from the lower formation, as indicated by the solid arrows of FIG. 14, will be directed from the lower end of the housing through the lower by-pass conduit 194 and the annular passage between the mandrel and housing, and into the upper housing opening 191, from which opening the flow passes upwardly out of the well through the tubing-casing annulus.

The mandrel 202 is provided with ports 210 therethrough intermediate the packing elements 207 and 208 for communication with the lower housing opening 192. Thus, the flow indicated by broken arrows from the upper formation will be directed into the mandrel flow passage 203 through the openings 192 and 210, from which flow passage the flow from the upper formation passes upwardly through the tubing and out of the well.

The regular flow tool 200 (FIG. 15) is provided with a flow passage 211 extending therethrough from one end to the other. However, similarly to the cross-over tool 199, the regular flow tool mandrel 211*a* is provided with a fishing neck 205 at its upper end and landing recesses 189 and 189*a* in the full opening through the mandrel flow passage. As well, packing elements 209 are carried by the regular flow tool mandrel intermediate its landing parts 206 and 206*a* such that the annular flow passage between the mandrel and housing is packed off above the uppermost conduit communication 195.

The mandrel 211*a* of this tool is, however, longer than the mandrel 202 of the cross-over tool such that packing elements 212 may be carried thereby on a level for sealing engagement with the housing beneath the lowermost conduit communications 198 and preferably above landing recess 190*a*. As can be seen from FIG. 15, the mandrel 211*a* is imperforate intermediate the packing elements 209 and 212 such that flow from the lower formation, as indicated by the solid arrows, is directed upwardly from the lower end of the housing through the flow passage 211 into the upper end of the housing, from which upper end the flow from the lower formation passes out of the well through the tubing. Flow from the upper formation, on the other hand, enters the annular passage between the mandrel and housing through opening 192 in the housing, as indicated by the broken arrows, and is directed into the upper housing opening 191, from which opening this flow passes upwardly out of the well through the tubing-casing annulus.

The mandrel 213 of the extension hanger 201 shown in FIG. 16 is also provided with a flow passage 214 extending continuously therethrough from one end to the other, as well as a fishing neck 205, landing parts 206 and 206*a* for cooperation with recesses 189 and 189*a*, respectively, and packing elements 209 intermediate the landing parts 206 and 206*a* for sealing engagement with the housing above the uppermost conduit communications 195.

Packing elements 215 are carried by the mandrel 213 for sealing engagement with the housing intermediate the uppermost conduit communications 195 and the upper housing opening 191. As well, a check valve 216 similar to the valve 89 of FIG. 3 is provided on the mandrel and has a valve member operable within the annular flow passage between the mandrel 213 and the housing on a level intermediate the upper housing opening 191 and lower conduit communications 196. As will be more fully understood hereinafter, this valve is adapted to permit flow from the opening 191 downwardly through the annular flow passage into the by-pass conduit 194.

Still further packing elements 217 and 218 are carried by the mandrel beneath the valve 216 on levels for sealing engagement with the housing intermediate the opening 192 therethrough and by-pass conduit communications 197 and 198, respectively. Similarly to corresponding elements on the above-described extension hangers of the other embodiments of this invention, as they are shown in FIGS. 1 to 3, 4 to 8, 9 to 10, and 11 to 13, these latter packing elements serve to pack off the lower housing opening 192 such that the upper formation is isolated but, at the same time, enabling a by-pass within the housing to be employed for circulation purposes within the casing beneath packer 55. Thus, as shown by the arrows of FIG. 16, the downwardly circulating fluid flows from the tubing-casing annulus into the lower end of the housing, from which point it flows upwardly to ground level through mandrel flow passage 214 and tubing 50. Also, a reversal of fluid flow—that is, down the tubing—will permit squeeze jobs to be performed on the lower formation inasmuch as the valve 216, similarly to the valve 89 of FIG. 3, will prevent the flow of fluid upwardly through the annular flow passage between the mandrel and housing.

In view of the foregoing description of the schematic representations of various embodiments of this invention, and particularly the mode of operation thereof, it is thought that the description to follow of the detailed structure of these embodiments will be easily understood. In this respect, an effort has been made to avoid duplication when the parts of the various embodiments are identical or so nearly identical as to not warrant their additional description. This is especially true inasmuch as such details are for illustrative purposes only and not meant to constitute limitations on the novel aspects of this invention.

In each of the views of FIGS. 17 to 30, inclusive, a part of each one of the details of the above-described embodiments is shown on an enlarged scale and out of the well casing. FIGS. 17A to 17D show the embodiment of FIGS. 1 to 3 with the cross-over tool 64 landed within the housing flow passage 57, as shown in FIG. 1. This housing comprises an uppermost landing nipple 219 which is internally threaded at its upper end for connection with the tubing string 50 and at its lower end for connection with a side port nipple 220. The side port nipple is in turn connected to a packer carrying sleeve 221 by means of a coupling 222. Threadedly secured to the lower end of the sleeve 221 is a tubular member 223, to be described more fully hereinafter, which contains the by-pass conduit 61 and lower housing opening 60. A polished nipple 224, also shown in FIG. 19 and to be more fully described in connection with the regular flow tool 65 of FIG. 2, is threadedly secured to the lower end of member 223 and defines the lower end of the housing.

An examination of FIGS. 17A to 17D collectively will readily indicate that the housing flow passage is at least substantially "full opening." That is, the minimum internal diameter in the flow passage corresponds to or is at least substantially the same as the drift diameter of the tubing string 50. Thus, as previously mentioned, production and work-over tools adapted to be run through the tubing are also runable through the housings of each of the embodiments of the present invention.

As previously indicated, the landing device shown in FIG. 17A is common to all of the removable tools with the exception of the extension hangers above described. The reason that a somewhat different type of landing mechanism is preferred in connection with the extension hangers is that the weight of such hangers frequently calls for a means to hold up the same. In either case, however, the construction of the landing nipple 219 with its full opening may be the same. The landing device preferred for the cross-over and regular flow tools, shown and to be described briefly in connection with FIG. 17A, is disclosed in full in Patent No. 2,673,614 to Miller. The other type of device preferred in connection with the extension hangers is disclosed in full in a copending application entitled "Well Devices," filed April 6, 1953, Serial No. 346,974.

Referring to FIG. 17A it is noted that the recess 58 is adapted to receive locking parts 68 in the form of dogs carried on the mandrel 70 and the longer recess **58*a* is adapted to receive landing parts 68*a* in the form of selector keys carried thereon. As can be seen from FIG. 17A, the cross-over tool 64 has been lowered by a wire line or other suitable means attached to the neck 67 to a level wherein the keys 68*a* selected and were expanded into the recess 58*a* by spring 225. At this time, the dogs 68 supported from dog carrier 226 slidable on head piece 227 of the mandrel 70 were above their position of FIG. 17A and only partially expanded into recess 58. However, as explained in the aforementioned patent, an upward pull on the wire line was sufficient to raise expander 228 and thereby force the dogs into the recess 58** and lock the entire tool against upward movement in the housing flow passage, as shown in FIG. 17A. It will be understood that such movement also raises the selector keys to collapse the same, as further shown.

The packing elements 73 may be conventional upwardly facing V-rings held between the lower end of expander 228 and a shoulder of portion 229 of the mandrel threadedly connected to said expander. As previously mentioned, such packing elements are of a size initially engageable and sealable with the surface against which they are to seal. From FIG. 17A, it can be seen that such elements are caused to seal off pressure thereabove and also serve to prevent the accumulation of debris in the landing parts therebelow. It should be noted from FIG. 17B, however, that the packing elements 74 below the landing parts and above the ports 59 are sealable against fluid pressure beneath same. If, on the other hand, the packing elements between the landing parts comprise the only means of sealing above the openings and conduits in the housing, as is the case with the packing elements 142, 171, 176, 181 and 209 of the embodiments of FIGS. 9 to 16, packing elements having V-rings facing in both directions would be used to seal against flow from above and below said packing elements.

Also, as discussed in the afore-mentioned patent, the sealing surface 230 on housing flow passage 57 against which the elements 73 seal, as well as the other sealing surfaces on the housing flow passage, are preferably of slightly less diameter than that of the tubing as well as the rest of the housing. In this manner, the packing elements carried on the tool may be moved vertically within the tubing out of sealed engagement therewith such that fluid may flow therepast and said elements will not be injured.

However, although the diameters of such sealing surfaces are not identical to the inner diameter of the tubing, they do define the minimum inner diameter through the housing which closely approximates that of the inner tubing diameter. More particularly, for the purpose of a "full opening" through the housing, to permit said housing to accommodate tools runable through the tubing, the diameter of such sealing surfaces are gauged to the drift diameter of the tubing such that said sealing surfaces are at least substantially the same or correspond, as the terms are used herein, to such drift diameter. For example, the drift diameter of 2″ tubing is approximately 1.901″ and the diameter of sealing surfaces within a housing usable with such tubing is approximately 1.875″.

Again as explained in the afore-mentioned patent, the dogs 68 may be retracted from recess 58 and the cross-over tool removed from the housing by means of a suitable tool for grasping shoulder 231 on dog carrier 226 and raising the dogs relative to the expander 228.

The side port nipple 220 is provided with the upper housing openings 59 extending radially therethrough and a sealing surface 232 toward the upper end of the flow passage 57 therethrough on a level to be engaged by packing elements 74 on the landed cross-over tool. A retrievable packer, such as packer 54 (FIG. 17C) may be carried on the sleeve 221 and be of conventional construction operable by means of right and left hand threaded connections between the sleeve and retainer members 233 to selectively set the expandable packing members 234 and slips 235 in an obvious manner. That is, rotation of the tubing and housing connected there with will either expand or collapse the packer, as desired.

Continuing further down the housing and with reference to FIG. 17D, the tubular member 223 is made up of two concentrically arranged tubes 236 and 237 which define the by-pass conduit 61 in an annular space therebetween. The outermost 237 of these tubes is welded or otherwise secured to collars 238 at its opposite ends, which are threadedly connected to the lower end of sleeve 221 and upper end of polished nipple 224.

The innermost tube 236 is provided with an outwardly projecting boss 239 which spans the conduit 61 and is welded to the inner diameter of tube 237 concentrically of a port 240 through said outermost tube. A port 241 axially through the boss is aligned with port 240 to form the opening 60 through the housing. The innermost tube 236 is shorter than tube 237 to define with collars 238 the communications 62 and 63 between the conduit 61 and flow passage above and below, respectively, the opening 60. Thus, it can be seen that the opening 60 will permit crossing over of flow between the housing flow passage and the exterior thereof separate from the annular conduit 61 which by-passes said opening.

Sealing surfaces 242 and 243 are formed on the flow passage 57 defined by the inner diameter of tube 236 through the tubular member 223 at levels thereon intermediate the port 241 and each of the communications 62 and 63, respectively. The polished nipple 224 is added to provide a further sealing surface 244 on the housing flow passage.

Beneath the sleeve 229, the cross-over tool 64 comprises two coupling members 245 and 246 connected together, with the first named being threaded to the lower end of sleeve 229 and the second supporting a spacer pipe 247. These connectors 245 and 246 are provided with opposed shoulders for holding packing elements 74 on a level for sealably engaging the sealing surface 232, as shown in FIG. 17B.

As can be seen from FIGS. 17B to 17D, the spacer pipe 247 extends longitudinally through and spaced from the housing to define the annular passage therebetween, and also is imperforate to provide a continuation of the axially extending flow passage 71 thereabove. A tubular member 248 (FIG. 17D) which is normally closed at its lower end by the valve 72 is threadedly connected at its upper end to the lower end of spacer pipe 247. This member 248 carries the packing elements 75 and 76 on a level for sealing engagement with the sealing surfaces 242 and 243 and has lower ports 77 communicating the flow passage 71 therein and exterior of the member intermediate said packing elements.

As previously mentioned, the valve 72 is normally operable to close the lower end of the flow passage 71 through the mandrel 70 to direct flow within the housing in the manner described in connection with FIG. 1. However, the valve is constructed to permit the lower end of the passage to be opened to equalize pressure above and below and facilitate removal of the cross-over tool. A valve similar to that shown in the afore-mentioned pending application may be used for this purpose.

However, as shown in FIG. 17D, this valve 72 includes a valve member 249 having a stem 250 extendible loosely through a reduced diameter portion 251 of the mandrel flow passage 71 in the tubular member 248. The valve member carries seals about its periphery cooperable with the bore of a housing 252 having a closed lower end and threadedly connected at its upper end to the lower end of member 248. A shear pin 253 between the valve member and housing 252 normally holds the valve closed, as shown in FIG. 17D. However, a suitable tool may be lowered through the mandrel flow passage to depress the valve stem 250 and thereby shear the pin 253. A port 254 is located through the wall of the housing in position to communicate with an annular passage above the valve member when the same is depressed, thereby communicating the housing flow passage beneath the valve and mandrel flow passage thereabove. A central bore 255 in the lower end of the valve member and a small port 256 communicating the bore with the above-mentioned annular passage permits said valve member to be lowered without difficulty.

Figure 19:
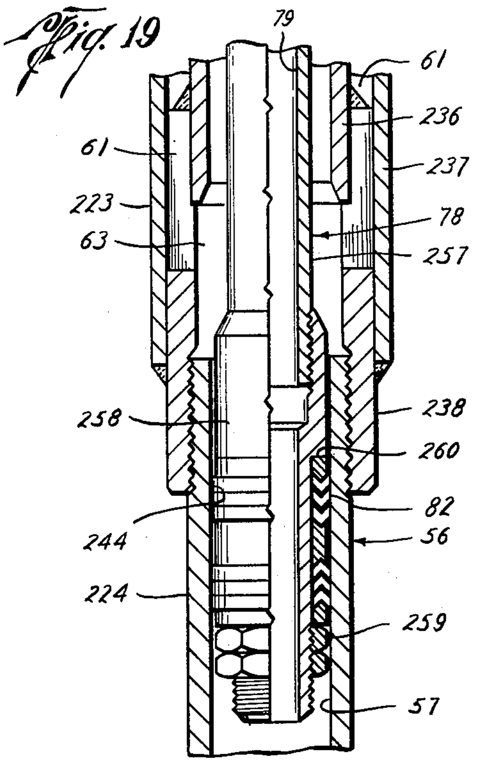
FIG. 19 is a view similar to FIG. 18, but showing another manner in which a removable tool may be packed off at its lower end within a tubular housing, and particularly the manner in which the regular flow tool of FIG. 2 is so packed off.

The details of the lower end of the regular flow tool mandrel 78 landed within the housing of the embodiment shown in FIG. 2 are illustrated in FIG. 19, it being understood the upper portion of the tool corresponds to that described in connection with the cross-over tool 64. That is, the spacer pipe 257 shown in FIG. 19 extends upwardly through and spaced from the housing for connection with the connecting member 246 shown in FIG. 17B. Also, of course, the spacer pipe is imperforate between its end to separate mandrel flow passage 79 from the annular flow passage between the mandrel and housing.

As shown in FIG. 19, a sleeve 258 is connected to the lower end of pipe 257 and defines therethrough a continuation of flow passage 79. The lower end of this sleeve is threaded to receive nuts 259 for holding packing elements 82 against a shoulder 260 on the sleeve and on a level for sealing engagement with the surface 244 of the polished nipple 224.

With reference now to FIGS. 20A and 20B, it can be seen that the extension hanger 66 landed in the housing 56 includes a spacer pipe section made up of an imperforate valve carrying tubular member 261, which may be extended upwardly for connection with member 246 of FIG. 17B similarly to the spacer pipe 247 of FIG. 17B, and a packer carrying tubular member 262 connected to the lower end thereof by means of collar 263. The hanger may be extended through the housing flow passage to any desired length within the well bore beneath packer 55 by means of pipe 264 connected to the lower end of tubular member 262.

Intermediate its ends, the tubular portion 261 is provided with a downwardly facing shoulder 265 to limit upward movement of an annular carrier 266 surrounding said portion and carrying packing elements 267 for engagement with the housing on the inner diameter of side port nipple 220 intermediate upper ports 59 and conduit communications 62. More particularly, the carrier comprises an upper part 268 for abutment with the shoulder 265 and a lower part 269 threadedly connected to part 268, said parts having oppositely facing and spaced apart shoulders for holding the packing elements 267 therebetween, as shown in FIG. 20A. An O-ring 269*a* is held between additional shoulders on parts 268 and 269 for sealing between the carrier 266 and tubular portion 261.

The lower end of lower carrier part 269 is provided with an annular recess 270 to receive one end of a compression coil spring 271. The other end of said spring abuts against the collar 263 beneath the valve such that the annular carrier 266 is normally urged to its uppermost position of FIG. 20A to maintain packing elements in engagement with the nipple 220. With the V-ring packing elements 267 facing as shown, it will be understood that fluid pressure downwardly on the carrier, as indicated by FIG. 3 during circulation, will overcome the resistance of spring 271 and open the annular passage between the mandrel and housing to fluid flow downwardly therethrough. On the other hand, flow in the opposite direction through the annular passage is prevented by elements 267, for a purpose previously described.

The tubular member 262 carries packing elements 87 and 88 for sealing engagement with the sealing surfaces 242 and 243 on the flow passage 57 intermediate the opening 60 and each of the conduit communications 62 and 63, respectively. This member 262 is imperforate intermediate its ends and in this respect differs from the lower portion of cross-over tool 64 as shown in FIG. 17D. As previously mentioned, an effect of the provision of this imperforate portion through the extension hanger is to pack off opening 60 through the housing and thus isolate the upper formation while using the bypass conduit 61 for work-over operations.

The details of the embodiment of FIGS. 4 to 8, at least as they differ from those of the embodiment of FIGS. 1 to 3, are shown in FIGS. 21A to 26, inclusive.

Figures 21A, 21B, 22:
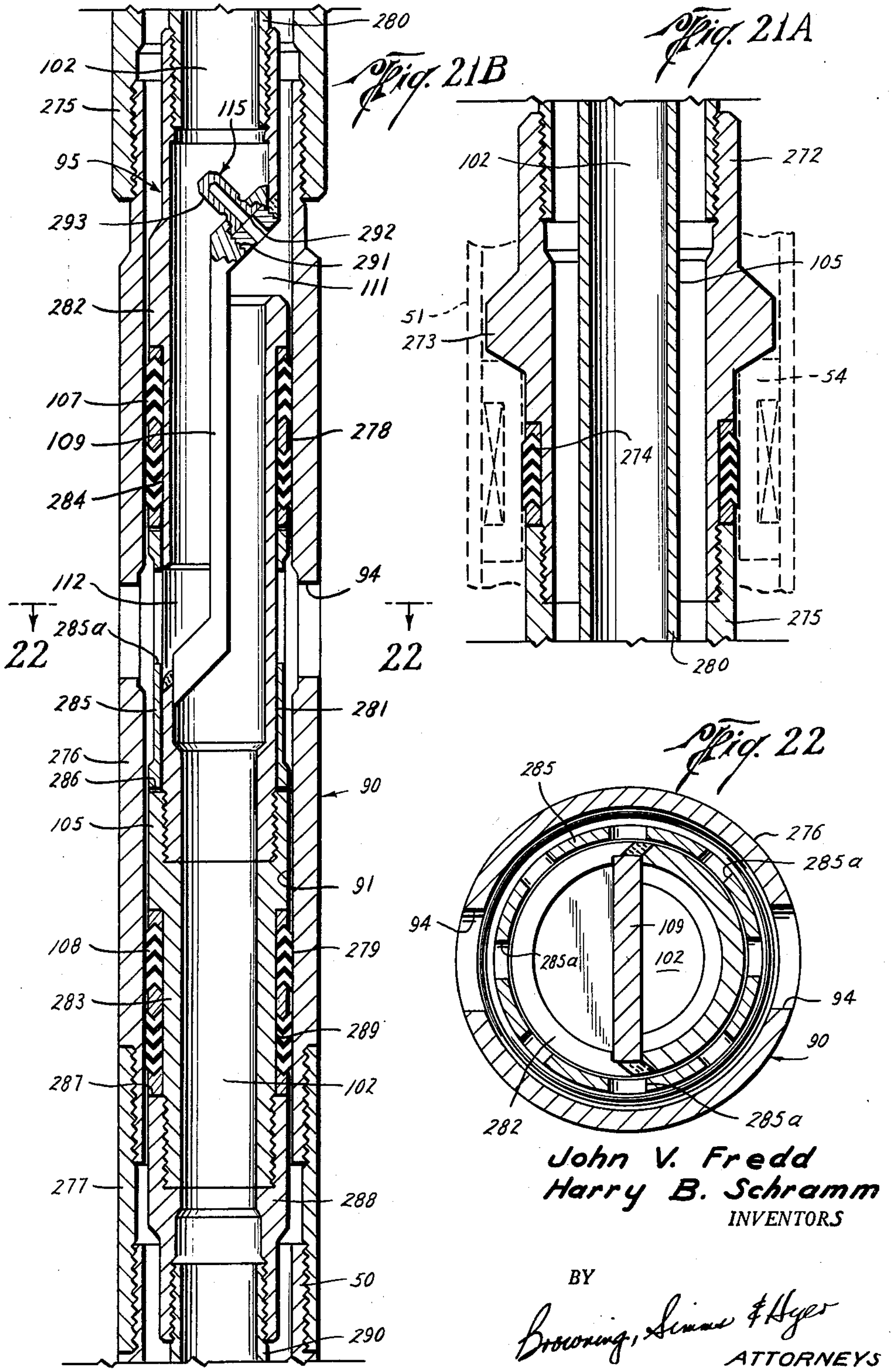
FIGS. 21A and 21B are detailed sectional views of the cross-over tool landed within the tubular housing of the embodiment shown in FIG. 4.
FIG. 22 is a cross-sectional view of the cross-over tool and housing of FIGS. 21A and 21B, taken along broken line 22—22 of FIG. 21B.
Figures 23, 25, 26:
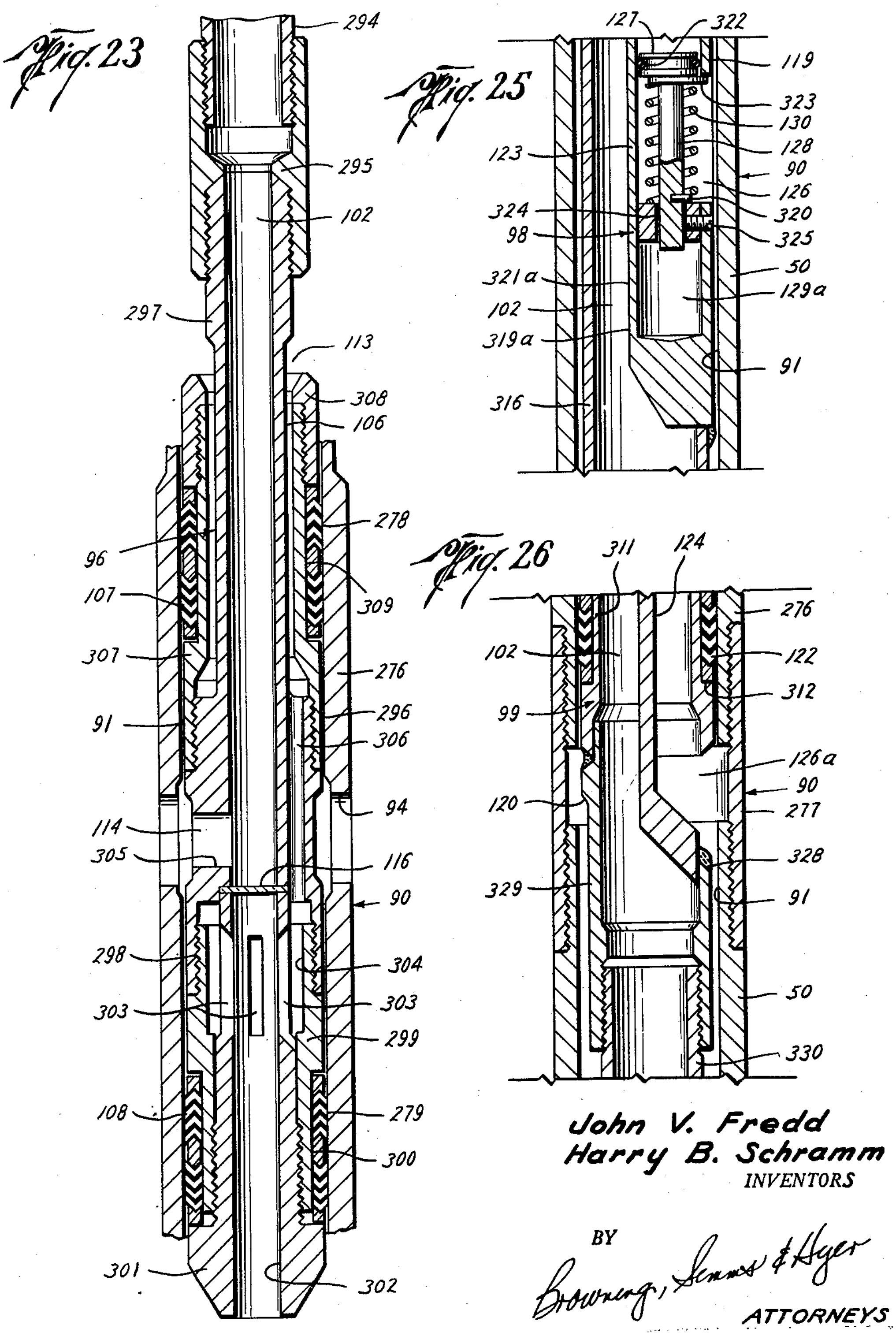
FIG. 23 is a detailed sectional view of a part of the alternate type of cross-over tool landed within the tubular housing of the device shown in FIG. 5.
FIG. 25 is a view similar to FIG. 24B, but showing a modified type of packing element testing device.
FIG. 26 is a detailed sectional view of a part of the alternate type of extension hanger landed within the tubular housing of the embodiment shown in FIG. 8.
Figure 24A:
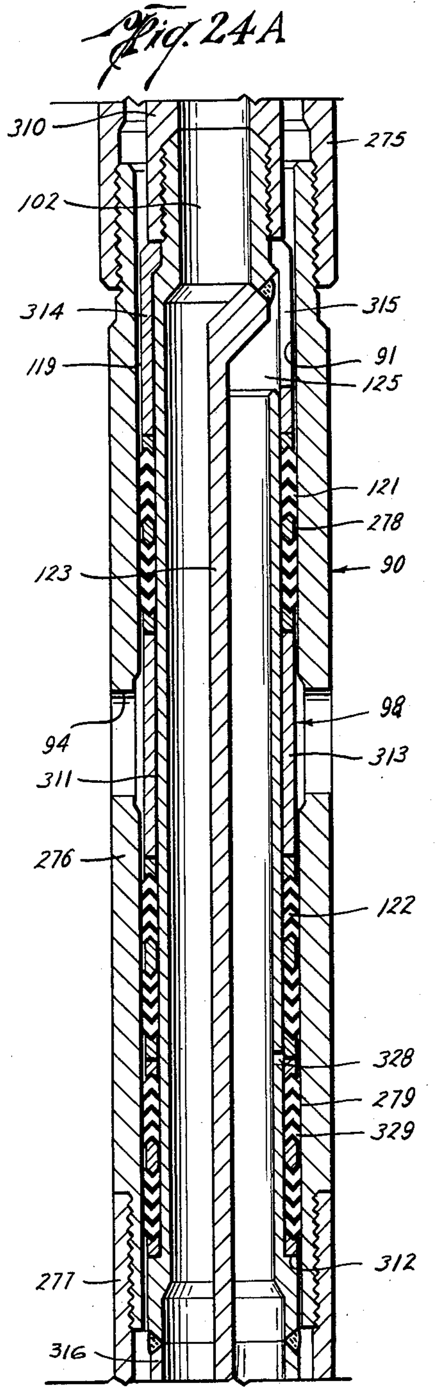
FIGS. 24A and 24B are further detailed sectional views of parts of the extension hanger landed within the tubular housing of the embodiment of the device shown in FIG. 7.
Figure 24B:
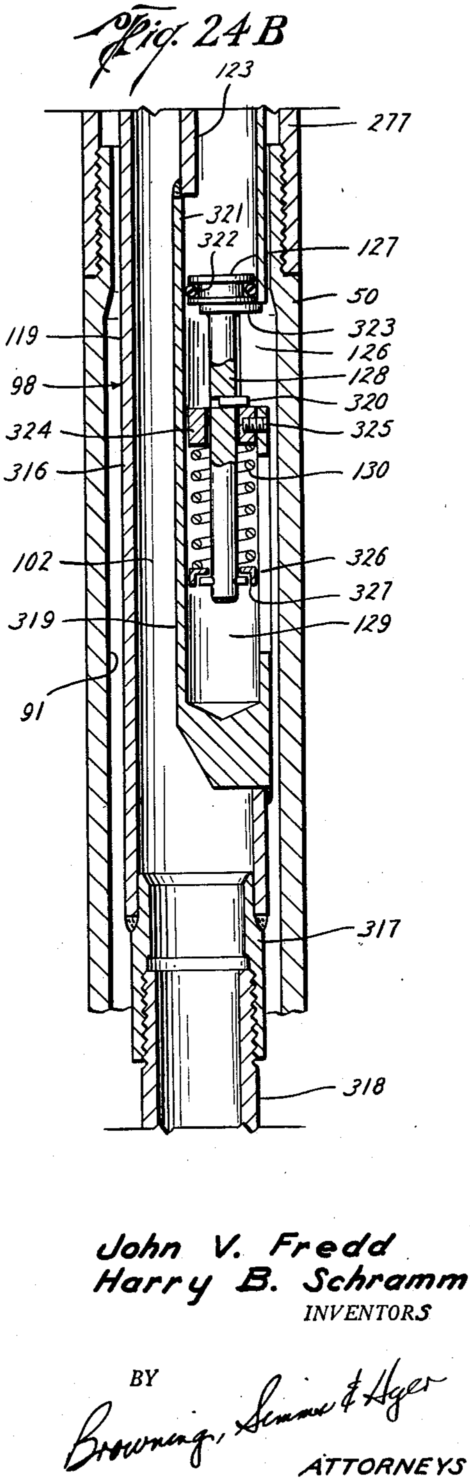

More particularly, details of the cross-over tool 95 landed as in FIG. 4 are shown in FIGS. 21A, 21B and 22; details of cross-over tool 96 in FIG. 5 in FIG. 23; details of the extension hanger 98 in FIG. 7 in FIGS. 24A and 24B; and the details of the alternate type of hanger 99 in FIG. 8 are shown in FIG. 26. The previously mentioned modification of the packing testing means of FIG. 24A is shown in FIG. 25.

Referring first to the cross-over tool 95 and the tubular housing 90 in which it is landed, it will be understood that the construction of the housing connected above tubular member 272 (FIG. 21A) may be substantially similar to a corresponding portion of the embodiment of FIGS. 1 to 3, shown particularly in FIGS. 17A and 17B. That is, landing recesses 92 and 92*a*, sealing surfaces for packing elements 103 and 104, and upper ports 93 are all provided in the housing portion above that shown in FIG. 21A. An annular shoulder 273 about the member 272 is adapted to rest on the non-retrievable type packer 54 such that packing elements 274 on the member beneath the shoulder are engageable and sealable with the inside diameter of the packer. Thus, as previously mentioned, the packer 54 may be first run and set within the casing 51 and the housing 90 then run partially therethrough and landed as shown in FIG. 21A. Of course, such operation is enabled by the uniform diameter of the housing portion beneath shoulder 273. Although the nonretrievable packer is indicated only diagrammatically in FIG. 21A, it will be understood that it may comprise any commercial structure well known in the industry such as one manufactured by Baker Oil Tools, Inc., known as product No. 415-D, and shown in detail on page 496 of the 1954–55 edition of the Composite Catalog of Oil Field and Pipeline Equipment.

The tubular member 272 is connected by a coupling 275 to a side port nipple 276 through which lower housing ports 94 are provided. The nipple 276 is in turn connected by another coupling 277 to the tubing string 50, and is provided with sealing surfaces 278 and 279 on the flow passage 91 therethrough intermediate the ports 94 and the upper and lower ends thereof, respectively.

The cross-over tool 95 is, of course, provided with landing parts on the upper end of its mandrel 105 for landing within the housing 90, similarly to the embodiment of FIGS. 1 to 3. Extending downwardly from the landing parts as a part of the cross-over tool mandrel is a spacer pipe 280 which defines a substantial length of the flow passage 102 beneath packing elements 103 and 104 (FIG. 4) sealable with sealing surfaces on the housing 90. A by-pass member 281 connected to the lower end of the spacer pipe 280 and defining the separate upper and lower conduits in the mandrel flow passage 102 is made up of an upper portion 282 and a lower portion 283 threadedly connected to said upper portion.

The upper portion 282 is provided with a reduced diameter 284 about which packing elements 107 are received for sealing engagement with the sealing surface 278. A sleeve 285 through which the ports 285*a* forming a part of communication 112 extend is also received about the upper portion 282 and is held between the lower end of packing elements 107 and an annular shoulder 286 on lower portion 283. The packing elements 108 are carried for sealing engagement with the surface 279 by means of an upwardly facing shoulder 287 on a coupling 288 connecting with lower portion 283 and holding said packing elements on a reduced diameter 289 of said lower portion. Further extension of the tool may be provided by a tubular member 290 connected to the collar 288.

The wall 109 is reversely bent at its ends, as shown in FIG. 21B, such that the central portion thereof divides the flow passage substantially equally and the opposite ends may be secured to opposite sides of said flow passage. Thus, the upper end of wall 109 is welded or otherwise secured to the upper portion 282 of tubular member 281 directly above the conduit communication 111 therethrough, while the lower end thereof is secured to the upper portion just beneath conduit communication 112. The member 281 is otherwise imperforate such that the upper and lower conduits in the flow passage communicating with ports 94 in the housing and the upper and lower ends of the housing, respectively, are separate from one another.

As previously mentioned, the frangible element 115 provides a means of commingling flow and equalizing pressures within these conduits. In the particular construction shown, a threaded opening 291 is provided through the upper end of wall 109 to receive the element 115 which has an axial bore 292 therein closed at its upper end by a cap portion 293. It will be understood that a tool lowered through the mandrel flow passage 102 would break off the cap and thus open up the bore 292 to flow therethrough.

The details of the portion of cross-over tool 96 (FIG. 5) landed in the housing 90 which differ from those above-described in connection with tool 95 in FIGS. 21A, 21B and 22 are shown in FIG. 23. In this case, the mandrel 106 includes a spacer pipe 294 connected by a collar 295 to a tubular assembly 296 which carries the packing elements 107 and 108 and defines the separate conduits within the mandrel flow passage 102. This assembly includes an upper tubular member 297 which is internally threaded about its lower end for connection at 298 with external threads on a lower tubular member 299. The packing elements 108 are received about and held on a reduced diameter 300 of lower member 299 in position for sealing engagement with surface 279 of the housing flow passage by means of a retainer 301 threaded into the lower open end of said lower member and having an inner diameter 302 therethrough forming the lower end of mandrel flow passage 102.

The upper portion of the retainer 301 is provided with radial slots 303 communicating the inner diameter 302 thereof with a chamber formed by a bore 304 within the upper end of lower member 299. Also, the upper end of the retainer serves to hold a frangible disc 116 of wall 110 in place against a lower portion of the upper member 297. As shown in FIG. 23, this lower portion of member 297 is enlarged not only for connection with lower tubular member 299 but also to define at least in part the conduits 113 and 114.

For this latter purpose, a port 305 is disposed radially through the enlarged portion in cross-over fashion with respect to axially extending openings 306 through said portion. Thus, the port 305 defines the lower conduit communication 114 which connects the mandrel exterior with the upper separate conduit within the mandrel flow passage. The openings 306, on the other hand, connect with an annular passage formed between the upper tubular member 297 and a sleeve 307 connected to the enlarged portion of said member and spaced therefrom, which annular passage in turn connects through ports 303 with upper conduit communication 113 between the mandrel exterior and the lower separate conduit. A cap 308 is threaded onto the top of sleeve 307 to hold packing elements 107 on a reduced diameter 309 thereof on a level for sealing engagement with surface 278 on the housing flow passage.

The details of the regular flow tool 97 shown landed in FIG. 6 within the housing 90 above-described correspond to those of the regular flow tool 66 shown in FIG. 3 of the embodiment of FIGS. 1 to 3. In fact, the construction of the regular tool in each of these embodiments may be identical, the only difference worthy of note being that, as shown in FIG. 6, the tool 97 is of such length that the lowermost packing elements 118 are sealably engageable with the housing of this embodiment of the invention just below lower openings 94 therethrough, while the lowermost packing elements 82 of the regular flow tool 65 of FIG. 2 are sealably engageable with the housing beneath the lower conduit communication 63.

Turning now to the extension hanger 98 which is shown in schematic fashion in FIG. 7 landed within the housing 90, it will be appreciated that the upper portion of this removable tool may be similar with that of the cross-over tools of FIGS. 4 and 5 with the exception previously mentioned as to the preferred landing device. Thus, as shown in FIGS. 24A and 24B, the details of extension hanger 98 are shown from its portion within the lower end of collar 275 of the housing on down. Beginning at this point on FIG. 24A, it can be seen that the lower end of a coupling 310 carried by a spacer pipe of the extension hanger mandrel 119 is threadedly connected to an inner sleeve 311. At its lower end, this inner sleeve 311 is provided with an annular shoulder 312 above which the packing elements 122 are carried on a level for sealing engagement with surface 279 of the housing flow passage 91. A spacer sleeve 313 is also received about the inner sleeve 311 above packing elements 122 and supports in turn the packing elements 122 on a level for sealing engagement with the surface 278 of the housing flow passage. Each of the packing elements 121 and 122, as well as the spacer sleeve 313, are held in place about the reduced diameter of inner sleeve 311 by a retainer sleeve 314 held down by the lower end of spacer pipe 310, as shown at the top of FIG. 24A.

The flow passage 102 through the extension hanger mandrel 119 is divided substantially equally by a vertically extending wall 123 which is angled and secured at its upper end by welding or other suitable means to a portion of the neck of inner sleeve 311. As will be more fully understood from the description to follow, and as previously mentioned, this wall serves to define a separate by-pass conduit within the mandrel 119. The uppermost communication 125 of this separate conduit with the exterior of the mandrel is provided by an opening through the upper end of the inner sleeve 311 and retainer sleeve 314 and designated by the numeral 315.

A downwardly extending tubular member 316 is welded or otherwise secured to the lower end of inner sleeve 311 and forms a continuation of the flow passage therethrough. A connector 317 is welded to the lower end of member 316 and is internally threaded for connection with another tubular member 318 which may extend downwardly into the well bore beneath packer 55 to any desired depth and forms the effective extension of the tubing previously mentioned.

As shown in FIG. 24B, the tubular member 316 is provided with an opening therethrough at one side to accommodate the novel packing element testing means of the present invention. As well, with the tubular housing 319 of this testing means fixedly disposed in the opening and secured, as shown at its upper end to the lower end of wall 123 and inner sleeve 311 and at its lower end to the lower portion of the opening through the tubular member 316, this opening through the tubular member defines the conduit communication 126 cooperable with the communication 125 for by-passing the lower housing ports 94 for the reason previously mentioned.

It has previously been stated in connection with FIG. 7 that the valve member 127 of the testing means is operable within the separate by-pass conduit defined by wall 123 and is provided with a stem 128 normally held in the position shown in FIG. 24B by a shear pin 320 for preventing flow through the separate conduit and having a coil spring 130 disposed for holding the valve open and out of the way of communication 126 to permit flow therethrough upon shearing of the pin. It can be seen that the inner portion 321 of the housing 319 forms in effect a continuation of the wall 123 and that a seal element 322 on the valve member is slidable within the housing 319 for preventing flow through the conduit in the position shown in FIG. 24B. Upward movement of the valve member beyond the position shown in this figure is prevented by a flange 323 on the valve stem 128.

The shear pin 320 is carried in the stem 128 in position to maintain the valve member 127 in its conduit closing position and engages a collar 324 which is pinned at 325 to the outer portion 326 of housing 319. The coil spring 130 is compressed between the lower side of collar 324 and a ring 327 carried on the lower end of stem 128. From the foregoing, it is apparent that upon shearing of the pin 320, the coil spring 130 will act upon ring 327 in urging the stem and valve member 127 downwardly such that flange 323 will rest upon the upper side of collar 324 and practically the full length of stem 128 will be received within the housing 129. In this position, the valve member 127 will be almost entirely out of the conduit communication 126 to permit flow therethrough without obstruction.

Turning now to a description of the manner in which the above-described valve functions in the novel packing testing means, there is shown in FIG. 24A a small port 328 through the inner sleeve 311 communicating the separate conduit within the extension hanger mandrel with the exterior of the mandrel at a point or level intermediate the packing elements 122 and additional packing elements 329 carried between the elements 122 and shoulder 312. The supporting retainers for each of the packing elements 122 and 329 are separated such that fluid pressure passing through port 328 will tend to separate said packing elements 122 and 329. Thus, it will be understood that with valve member 127 disposed within the separate conduit for preventing flow therethrough, fluid pressure exerted downwardly into this separate passage will be in turn exerted upon the V-rings of the packing elements 121, 122 and 329, the purpose of which is to seal off ports 94 in the housing 90. In this manner, the seal between these packing elements and their sealing surfaces may be tested up to a predetermined pressure by observing whether the pressure within the conduit is maintained. Of course, if the pressure drops, a failure or leak through one or more of the packing elements is indicated.

Upon completion of this testing, the pressure can be increased beyond the said predetermined amount to shear the pin 320 and lower valve member 127 to permit flow through the separate conduit. At this time, the extension hanger 98 can be used for the purpose of circulating fluid within the well bore below packer 55.

In this connection, a modification of the above-described packing testing means is shown in FIG. 25. In addition to providing a means for testing the packing elements 121 and 122, this modified valve structure is operable to permit squeeze jobs to be performed upon the lower formation. As shown in this FIG. 25, the coil spring 130 is compressed between the upper side of collar 324 and the flange 323 on the valve stem 128. Thus, the valve 127 is urged by the coil spring to a closed rather than an open position. It will further be noted that the valve stem is not of the great length shown in the embodiment of FIG. 24B such that the chamber 129*a* within housing 319*a* need not be so large.

It will be appreciated that this modified structure can be used for the same purposes in testing the packing elements as the structure shown in FIG. 24B. That is, the shear pin 320 will hold the valve member 127 within the separate conduit for preventing flow therethrough up to a predetermined pressure within said conduit. Also, upon shearing of the pin 320, a relatively weak spring 130 can be overcome by the downwardly circulating fluid within the separate conduit to hold the valve open and permit circulation within the well bore beneath packer 55. On the other hand, upon reversal of this circulation such that the flow would normally be upwardly through the separate conduit while downwardly through the mandrel flow passage 102, it will be understood that the valve member 127 is urged to its closing position within the conduit. Thus, this valve may be used similarly to the valve 89 of the embodiment of FIGS. 1 to 3 to permit squeeze pressures to be exerted upon the lower formation.

The details of a still further modification 99 of the extension hanger of this embodiment of the invention, shown in FIG. 8 of the schematic views, differ from those of the previously described hanger 98 as shown in FIG. 26. As can be seen in this figure, the imperforate wall 124 corresponding to wall 123 of FIGS. 24A and 24B terminates shortly below the inner sleeve 311 and is bent for connection as by welding with an opening 328 through a tubular member 329 connected to the lower end of inner sleeve 311. A tubular member 330 is threaded to the lower end of member 329 and may be extended downwardly to any desired length within the well bore beneath packer 55. It can be seen from the foregoing that the opening 328 defines the conduit communication **126*a* connecting the separate conduit within the mandrel with the exterior of the mandrel beneath packing elements 122. As indicated upon the schematic drawing of FIG. 8, this particular extension hanger 99** is not provided with means for testing the packing elements.

Figure 27:
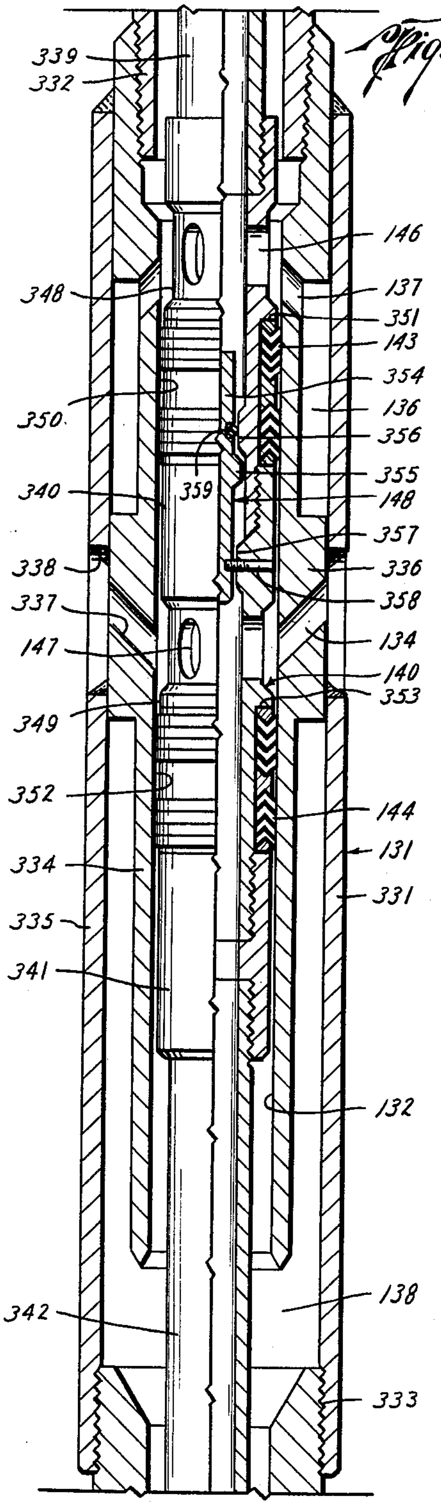
FIG. 27 is a detailed sectional view of the upper portion of the cross-over tool and housing of the embodiment shown in FIG. 9, and particularly with packing elements on the cross-over tool in operative position with respect to the housing by-pass conduit and upper openings therethrough.

Details of the embodiment of the present invention shown in FIGS. 9 and 10 are illustrated in FIGS. 27 and and 18, these figures showing in particular the cross-over tool 140 of this embodiment landed in place within the tubular housing 131 thereof. Referring first to FIG. 27, it will be understood that the by-pass assembly 331 may be threadedly connected to the lower end of landing nipple 332 similar to nipple 219 of the above-described embodiments whereby the tool 140 may be landed in a manner similar to that shown in FIG. 17A. However, with reference to a previous statement as to a slight modification in this landing means, the packing elements 142 are of a type which seal against fluid pressure from opposite directions. Thus, one group of such elements will suffice instead of the spaced sets of packing elements such as 73 and 74 in FIGS. 17A and 17B.

The lower end of the by-pass assembly 331 may be connected as at 333 to suitable tubular members for carrying the packer 54. Inasmuch as the details of such packer may correspond to those previously described in connection with the embodiment of FIGS. 1 to 3, such details are not shown herein. As shown in FIG. 27, the by-pass assembly 331 comprises inner and outer sleeves 334 and 335, respectively, which are welded or otherwise secured together in concentric relation. In this respect, reference may be had to FIG. 17D, wherein it will be found that this portion of the housing of the embodiment of FIGS. 1 to 3 is quite similar to that shown in FIG. 27. That is, the inner diameter of sleeve 334 defines the housing flow passage 132 and said inner sleeve is provided with an outwardly projecting boss 336 through which ports 337 are extended. Ports 338 through the outer sleeve 335 are aligned with the ports 337 to form the upper housing openings 134. Upper conduit communications 137 consist of ports formed through the inner sleeve, while the lower conduit communications 138 are formed by the interruption of the lower end of inner sleeve 334 short of the tubular member to which outer sleeve 335 is connected at 333.

The upper end of the mandrel of the cross-over tool 140 shown in FIG. 27 comprises a tubular member 339 corresponding to portion 229 of FIG. 17A and to which the packer carrying tubular member 340 is threadedly connected. This latter portion of the cross-over tool mandrel is in turn connected by a collar 341 to a spacer pipe 342 which extends downwardly through the housing flow passage 132 in spaced relation to the housing where, as shown in FIG. 18, it is threadedly connected to a tubular support 343 for packing elements 145. As shown in this latter figure, the lower end of support 343 is threaded to receive a nut 344 which holds the packing elements 145 against a shoulder 345 on said support. More particularly, the packing elements 145 are carried by the support 343 on a reduced diameter of support 343 on a level for sealing engagement with a sealing surface 346 on the inner diameter of nipple 347 beneath the lower housing port 135 therethrough. The upper end of nipple 347 may be connected to the lower end of the tubular member carrying packer 54.

Referring now back to FIG. 27, it can be seen that the tubular packer carrying member 340 is formed of upper and lower threadedly connected parts 348 and 349, respectively. The packing elements 143 are carried about a reduced diameter on the upper part 348 and are held in position thereon for sealing engagement with sealing surface 350 on the flow passage 132 through inner sleeve 334 by means of shoulder 351 on the upper part 348 and the upper end of lower part 349. The packing elements 144 are similarly held in place for sealing engagement with surface 351 within flow passage 132 by means of a shoulder 353 on lower parts 349 and the upper end of collar 341. Ports 146 are extended through upper part 348 above packing elements 143 for communication with conduit communications 137, while ports 147 are disposed through the lower part 349 above packing elements 144 carried thereby for communication with upper housing openings 134.

As previously mentioned, means 148 are provided within the mandrel flow passage for normally preventing flow therethrough such that flow upwardly through the cross-over tool mandrel flow passage will be directed through ports 147 and openings 134 into the tubing-casing annulus, while flow upwardly in the annular passage between the mandrel and housing will be directed through the by-pass conduit 136 and into the mandrel flow passage through conduit communications 137 and ports 146. This means 148 includes a valve similar to that shown in FIG. 17D with the embodiment of FIGS. 1 to 3 in that it is selectively operable to equalize pressures at opposite sides thereof. That is, a suitable tool may be lowered within the mandrel flow passage for engagement with the valve body whereby it will be actuated to permit fluid flow therethrough.

This means 148 comprises reduced diameter portions on the mandrel within the flow passage cooperable with a body 354 movable within said flow passage and having an annular shoulder 355 confined for movement between said reduced diameter portions. More particularly, an upper reduced portion 356 is formed in upper part 348 and the lower 357 of said portions formed in lower part 349. As shown in FIG. 27, the length of body 354 is adapted to slide freely within these reduced diameter portions, while the shoulder 355 is adapted to be movable within the annular recess defined between portions 355 and 357. The body 354 is held in normal or flow preventing position, as shown in FIG. 27, by a shear pin 358 connecting the body with the reduced diameter portion 357. In this normal position, an O-ring or other sealing element 359 carried on the body above its shoulder 355 is sealably engageable with the upper reduced diameter portion 356. It can be seen, however, that upon shearing of pin 358, the seal element 359 will be lowered below upper reduced diameter portion 356 to a level opposite the recess between the upper and lower reduced diameter portions such that its seal is rendered ineffective and fluid flow is permitted through the mandrel flow passage.

Inasmuch as the regular flow tool 139 of this embodiment of the invention is so similar to those previously described, the details thereof are not repeated. Also, it will be recalled that this embodiment of the invention is not provided with a work-over tool in the form of an extension hanger, although the tubular housing is, in accordance with the novel concepts of this invention, provided with a full opening therethrough to accommodate production tools and the like, an example of which is the previously mentioned safety valve indicated by the broken lines of FIG. 18.

Figure 28:
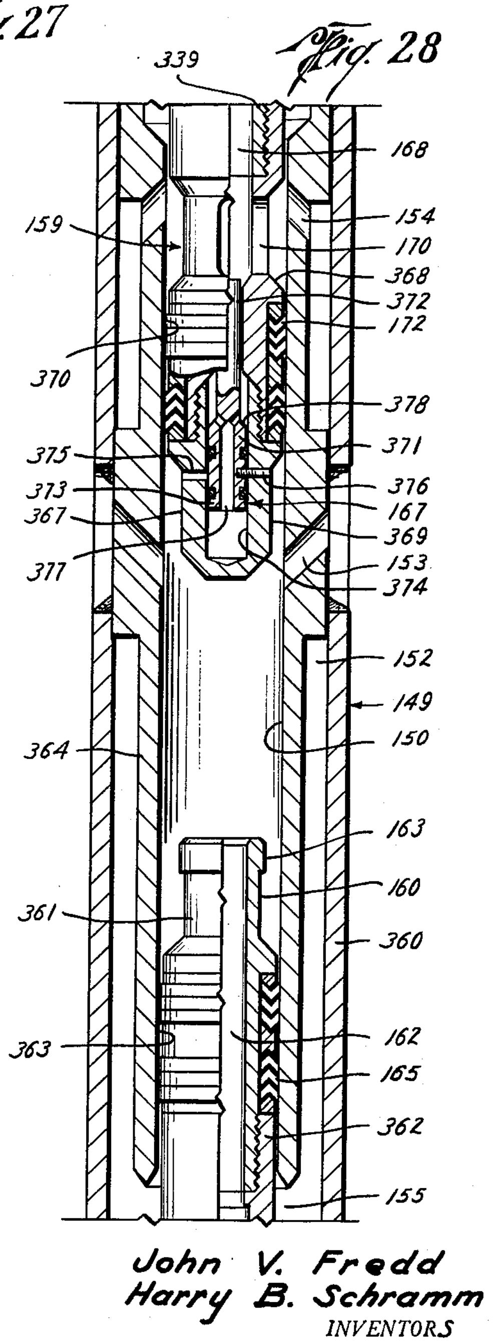
FIG. 28 is a view similar to FIG. 27, but illustrating the embodiment of FIG. 11 wherein the cross-over tool thereof is formed in two separable parts.

In the embodiment of the device of this invention shown in schematic fashion in FIGS. 11 to 13, inclusive, the details of which are shown in FIGS. 28 and 29, the upper portion of the tubular housing 149 corresponds to that of tubular housing 131 in the embodiment of FIGS. 9 and 10. The lower portion thereof differs, however, as shown in FIG. 29, in that it is provided with landing recesses 157 and 157*a* to permit the lower mandrel 160 usable with both the cross-over tool shown in FIG. 11 and the regular flow tool shown in FIG. 12, as well as plug mandrel 183, to be landed and the switching over between cross-over and regular flow accomplished by the selective removal and landing of mandrels 159 and 173 of the cross-over and regular flow tools, respectively.

Thus, with reference to the lower portion of the tubular housing 149 of this embodiment, it can be seen in connection with FIGS. 28 and 29 that the lower end of the outer sleeve 360 is threadedly connected to a short tubular member 361 which defines the lower portion of conduit communications 155 similar to communications 138 of FIG. 27, which member 361 is in turn threadedly connected at its lower end to a tubular member 362 which carries the upper packer 54 in a manner previously described in connection with the other embodiments of the invention. The lower end of tubular member 362 carries a landing nipple 363 having the recesses 157 and 157*a* formed in the housing flow passage 150 therethrough. Of course, this flow passage is full opening similarly to the flow passage through the landing recesses at the upper ends of the tubular housings.

It can be seen from FIG. 28 that the lower mandrel 160 common to both the cross-over and regular flow tool of FIGS. 11 and 12, respectively, is provided with the flow passage 162 which extends therethrough from one end to the other and a fishing neck 163 about its upper end. Separable parts 361 and 362 of the mandrel are connected together as shown to hold packing elements 165 on a level for sealing engagement with sealing surface 363 through the flow passage 150 within the inner sleeve 364. The lower end of this mandrel 160 is not shown in detail in FIG. 28, although it will be understood that the part 362 may be extended downwardly to define a spacer pipe connected with landing parts of a type shown in the lower portion of FIG. 29 for landing the mandrel 160 in place within the housing flow passage.

These landing parts 164 and 164*a*, as shown in FIGS. 11 and 12, may be carried on a suitable landing nipple connected to spacer pipe 362 in FIG. 28 and have a flow passage 162 extending therethrough in a manner similar to the landing parts 184 and 184*a* on carrier 365, as shown on the lower end of FIG. 29. As well, packing elements 166 may be carried by the mandrel 160 on a level for sealing engagement with surface 366 on the housing flow passage 150 similarly to packing elements 185.

Referring now to FIG. 28 for the details of the removable mandrel 159 of the cross-over tool for this embodiment, it will be appreciated that the portion of this mandrel above that shown in FIG. 28 may be similar to that of the cross-over tool 140 shown in FIG. 27. That is, a packer carrying tubular member 367 is threadedly connected to the lower end of another tubular member 339 and carries packing elements 172 and valve 167 as well as being provided with ports 170 therethrough. More particularly, the tubular member 367 is made up of upper and lower parts 368 and 369, respectively, in a manner to hold the packing elements 172 about a reduced diameter of the upper part 368 on a level for sealing engagement with surface 370 on the flow passage 150 through inner sleeve 364. The ports 170 are extended through the upper part 368 above packing elements 172 for communicating mandrel flow passage 168 with upper housing conduits 154 for a purpose previously described. This flow passage is normally closed by the valve 167 quite similar in construction and operation to the valve 72 previously described in connection with FIG. 17D. That is, this valve 167 includes a body 371 having a stem 372 loosely slidable within a reduced diameter portion of upper part 368 and a lower valve member portion 373 carrying seal elements about its periphery for sealing engagement with a bore 374 in the lower part 369. A port 375 is provided through the lower part 369 on a level to communicate the exterior thereof with the bore 374 upon lowering of valve member 371 into the bore. That is, communication is established about the stem 372 and through the reduced diameter portion of upper part 368 into the mandrel flow passage 168. However, as described in connection with valve 72, the body 370 is held in the normal flow preventing position shown in FIG. 28 by means of shear pin 376. Also, this pin is sheared upon lowering of a suitable tool into the mandrel flow passage 168 to a position to lower the body 370. A bore 377 in the lower end of valve member 373 and ports 378 communicating the exterior of the valve member portion with the bore 377 permit lowering of the body 371 without difficulty.

Although its details are not illustrated, the regular flow tool mandrel 173 will, of course, correspond to the removable mandrel 159 of the cross-over tool except for the lower portion thereof which is open as shown in FIG. 12 to provide a flow passage 174 extending through the mandrel from one end thereof to the other. The lower end of such mandrel 173 would appear similar to the mandrel 178 of FIG. 29, but with packing elements 177 sealably engageable with surface 363 within inner sleeve 364, as shown in FIG. 28, above mandral 160 but below ports 153.

The details of the mandrels 178 and 183 for use in "Sandfracing" of the upper formation are shown in FIG. 29. Only the lower end of mandrel 179 is shown as its upper end would correspond to the cross-over mandrel 159 and regular flow mandrel 173. In fact, this mandrel 179 differs from regular flow mandrel 173 only in that its spacer pipe portion 379 is longer. As shown in FIG. 29, the packing elements 182 are held about a reduced diameter portion of the spacer pipe 379 by a retainer 380 threaded thereto and on a level for sealing engagement with a surface 381 on the flow passage 150 through short tubular member 361.

The details of the plug mandrel 183 in the lower portion of FIG. 29 have been previously mentioned. However, it may be added that the mandrel is made up of the carrier 365 which is threadedly connected to a head member 382 having a passage 382*a* therethrough closed against downward flow by a check valve 383 on which the fishing neck 186 is formed. The packing elements 185 are held between a shoulder 384 on the head and the ring 385.

Only one portion of the embodiment of FIGS. 14 to 16, inclusive, is shown in FIG. 30 as such embodiment comprises an accumulation of structural features described above in connection with the other embodiments. Thus, the tubular housing 187 may be provided with a by-pass conduit 193 above packer 54 similar to either conduit 136 described in connection with the embodiment of FIGS. 9 and 10 or conduit 152 described in connection with the embodiment of FIGS. 11 to 13. Details of the housing portions embodying these conduits are shown in FIGS. 27 and 28. Still further, the by-pass conduit 194 below packer 54 may be constructed similar to the conduit 61 provided in the housing of the embodiment of FIGS. 1 to 3 and detailed in FIG. 17D. As well, lower landing recesses 190 and 190*a* may be provided in the housing 187 to accommodate a plug mandrel such as shown at 183 in FIG. 13.

Both the cross-over tool 199 and regular flow tool 200 as shown landed in the housing 187 in FIGS. 14 and 15, respectively, may be constructed similarly to those removable tools of the first embodiment of FIGS. 1 to 3. The same may be said of the extension hanger 201 shown landed in FIG. 16. Although the construction of this tool per se may be identical to the tool 66 of FIG. 3, it is well to note the different manner in which this tool 201 cooperates with its housing 187.

Specifically, as shown in FIG. 30, the packing elements 267 of the check valve 216 are operable within an annular passage between tubular member 261 about which the valve member 266 is carried and the mandrel through the inner sleeve 386 of the conduit assembly above packer 54. When in the closed position shown in FIG. 30, the valve prevents flow upwardly from conduit communication 196 through said annular passage.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A well apparatus comprising, a tubular housing having a flow passage therethrough and adapted to be secured in a string of tubing and to receive a packer about a portion of its exterior to seal off between said housing and a surrounding well casing, a first opening through the housing communicating its flow passage with the exterior thereof above the portion to receive the packer, a second opening through the housing communicating the flow passage thereof below the first opening with the exterior of the housing below the packer receiving portion, sealing surfaces on the housing flow passage above, below and intermediate the intersections of the first and second openings therewith, a tool having a flow passage therethrough removably disposable within said housing in spaced relation thereto, and packing elements on the tool for simultaneous sealing engagement with said surfaces, the tool being imperforate intermediate said packing elements and defining a flow path communicable through the lower end of the tool with a flow path between the tool and housing which communicates with the first housing opening, said last-mentioned flow path including means providing a passageway in one of said housing and tool for bypassing the second opening through the housing and the lower and intermediate packing elements on said tool.

2. For use in work-over operations upon the lower zone of a two-zone well wherein a tubular housing is connected in a tubing string within the well and a packer about the housing packs off between the housing and well wall above the upper zone, said housing being provided with openings therethrough communicating the interior thereof with its exterior above and below the packer, the improvement comprising a mandrel removably landable within the housing in spaced relation thereto and having a continuous imperforate conduit therethrough from one end thereof to the other, packing elements on the mandrel sealably engageable with the housing above and below the housing opening communicating with the housing exterior below the packer to seal off flow from the upper zone, and additional packing elements on the mandrel sealably engageable with the housing interior above the intersection therewith of said other housing opening, said mandrel and housing defining a conduit in the space therebetween below said additional packing elements, which conduit communicates with the conduit through the mandrel at its lower end to provide a fluid course therewith, said conduit defined by the mandrel and housing including a passageway bypassing the first-mentioned packing elements and the opening in the housing below the packer.

3. A mandrel of the character defined in claim 2, including valve means on the mandrel in the conduit between said mandrel and housing permitting flow in one directional sense through said conduit but preventing flow therethrough in an opposite directional sense.

4. A mandrel of the character defined in claim 2, wherein the conduit between the mandrel and housing includes a by-pass on the mandrel communicating with the exterior thereof above and below the packing elements sealably engageable with the housing above and below the opening therethrough communicating with the housing exterior below the packer.

5. A tubular mandrel disposable within and spaced from a well conduit and having a passageway extending therethrough, packing elements carried about a portion of the mandrel for sealing engagement with the well conduit, and means for testing the sealing engagement between the packing elements and the well conduit under a predetermined fluid pressure, said means comprising wall means defining a flow passage between said passageway through the mandrel and the portion thereof carrying the packing elements and communicating with the exterior of the mandrel above and below said packing elements, a valve member seatable within said flow passage intermediate the communications thereof with the exterior of the mandrel for preventing flow through said passage and thereby building up fluid pressure on said packing elements due to fluid flow into said passage, and means maintaining said valve member seated within said passage but releasable upon building up of said pressure above said predetermined amount to permit unseating of said valve member and flow through said passage.

6. A tubular mandrel of the character defined in claim 5, wherein means are provided for positively holding said valve member unseated upon release of said maintaining means.

7. A tubular mandrel of the character defined in claim 5, wherein resilient means are provided for normally urging the valve member to seated position upon release of said maintaining means.

8. A tubular mandrel of the character defined in claim 5, wherein said packing elements are spaced for sealing engagement above and below an opening through the wall of the well conduit, the lower packing element being divided into two vertically arranged components, and a port through the mandrel portion carrying the packing elements communicating the flow passage on the side of the valve member to be pressurized with the exterior of said mandrel portion intermediate said packing element components.

9. A flow directing tool disposable within a well conduit and comprising, an elongate tubular mandrel open at opposite ends, port means through the mandrel communicating the interior with the exterior thereof at two longitudinally spaced levels, packing elements carried about the periphery of the mandrel for sealing engagement with the well conduit at longitudinally spaced levels above the exterior communication of the upper port means, below the exterior communication of the lower port means, and intermediate the exterior communication of said upper and lower port means, and wall means interiorly of the mandrel dividing the same into two separate conduits, one of which communicates the open lower end of the mandrel with the upper port means and the other of which communicates the lower port means with the upper open end of the mandrel, means on the mandrel above the upper packing elements for releasable disposal within a recess of the well conduit to resist upward movement of the mandrel within said conduit, and means formed about the upper end of the mandrel to facilitate movement of the mandrel by wire line vertically within said well conduit.

10. A flow directing tool of the character defined in claim 9, wherein said mandrel is provided with a frangible element operable upon being broken to communicate one of said mandrel conduits with the port means through the mandrel communicating with the other of said conduits.

11. A flow directing tool of the character defined in claim 10, wherein said frangible element is disposed within the mandrel conduit communicating with the upper open end thereof in position to be broken by means lowered through said upper end.

12. In combination, an elongate tubular housing having a flow passage extending axially therethrough from one end to the other and adapted to be packed off within a well casing above an intermediate portion of its exterior, an upper opening through the housing communicating an upper level of the flow passage with the housing exterior above the portion thereof to be packed off and a lower opening through the housing communicating a lower level of the flow passage with the housing exterior below said portion, a mandrel open at both ends and selectively positionable within the housing flow passage and spaced from the housing, packing elements carried by the mandrel for sealing engagement with the housing above the upper opening, below the lower opening, and intermediate said upper and lower openings, means forming two separate flow passages within the mandrel, the first of which communicates with the upper end of the mandrel and the second of which communicates with the lower end thereof, a port through the mandrel communicating the exterior of the mandrel intermediate the lower and intermediate packing elements with the first mandrel flow passage to direct flow therethrough from the lower housing opening into the upper end of the housing, and another port through the mandrel communicating the exterior thereof intermediate the upper and intermediate packing elements with the second mandrel flow passage to direct flow therethrough from the lower end of the housing into the upper housing opening.

13. In combination, an elongate tubular housing having a flow passage extending axially therethrough from one end to the other and adapted to be packed off within a well casing about an intermediate portion of its exterior, an upper opening through the housing communicating an upper level of the flow passage with the housing exterior above the portion thereof to be packed off and a lower opening through the housing communicating a lower level of the flow passage with the housing exterior below said portion, a mandrel open at both ends and selectively positionable within the housing flow passage and spaced from the housing, packing elements carried by the mandrel for sealing engagement with the housing above the upper opening, below the lower opening, and intermediate said upper and lower openings, means forming two separate flow passages within the mandrel, the first of which extends continuously between opposite open ends of the mandrel, and ports through the mandrel communicating the second of said flow passages with the exterior of the mandrel below the lower packing elements and intermediate the upper and intermediate packing elements, said means forming the first mandrel flow passage being imperforate between the upper and lower packing elements and said means forming the second mandrel flow passage being imperforate betwen the ports therethrough to establish a flow path between the lower end of the housing and the upper end thereof separate from a flow path between the lower end of the housing and the upper housing opening.

14. A well tool comprising a tubular housing connected in a tubing string and having a conduit extending therethrough from one end to the other, an intermediate portion of said housing being packed off within a well casing, openings through the housing communicating the conduit therethrough with the interior of the housing above and below the portion thereof packed off, a plurality of flow directing devices selectively and alternately positionable within the housing conduit, each such device including tubular body means spaced from the housing conduit wall when positioned therein to provide with the housing conduit two separate flow passages longitudinally through the intermediate portion of the housing, a first of said devices having packing means about its body means for sealing with the housing conduit wall to define a first flow path communicating the lower end of the housing with the upper end thereof through one of said flow passages and a second flow path communicating the housing opening communicating with the exterior thereof below the portion packed off with the housing opening communicating with said exterior above said housing portion packed off through the other of said flow passages, a second of said devices having packing means about its body means for sealing with the housing conduit wall to define a first flow path communicating the lower end of the housing with the housing opening communicating with the exterior thereof above the housing portion packed off through one of said flow passages and a second flow path communicating the housing opening communicating with the exterior thereof below the housing portion packed off with the upper end of the housing through the other of said flow passages, a third of said devices having packing means about its body means for sealing with the housing conduit wall to define a first flow path communicating the housing opening communicating with the exterior thereof above the housing portion packed off with the lower end of the housing through one of said flow passages and a second flow path communicating said lower end of the housing with the upper end thereof through the other of said flow passages, and means on said flow directing devices by which they may be selectively or alternately positioned within the housing conduit.

15. A well tool comprising, a tubular housing connected in a tubing string and having a conduit extending therethrough from one end to the other, an intermediate portion of said housing being packed off within a well casing, openings through the housing communicating the conduit therethrough with the exterior of the housing above and below the portion thereof packed off, a plurality of flow directing devices selectively and alternately positionable within the housing conduit, each such device including tubular body means spaced from the housing conduit when positioned therein to provide with the housing conduit two separate flow passages longitudinally through the intermediate portion of the housing, a first of said devices having packing means about its body means for sealing with the housing conduit wall to define a first flow path communicating the lower end of the housing with one of the upper end of the housing and the housing opening communicating with the exterior thereof above the housing portion to be packed off through one of said flow passages and a second flow path communicating the housing opening communicating with the exterior thereof below the housing portion packed off with the other of the upper end of the housing and the housing opening communicating with the exterior thereof above the housing portion packed off through the other of said flow passages, a second of said devices having packing means about its body means for sealing with the housing conduit wall to define a first flow path communicating the housing opening communicating with the exterior thereof above the housing portion packed off with the lower end of the housing through one of said flow passages and a second flow path communicating said lower end of the housing with the upper end thereof through the other of said flow passages, and means on said flow directing devices by which they may be selectively and alternately positioned within the housing conduit.

16. A well tool comprising, a tubular housing connected in a tubing string and having a conduit extending therethrough from one end to the other, an intermediate portion of said housing being packed off with in a well casing, openings through the housing communicating the conduit therethrough with the exterior of the housing above and below the portion thereof packed off, a plurality of flow directing devices selectively and alternately positionable within the housing conduit, each such device including tubular body means spaced from the housing conduit when positioned therein to provide with the housing conduit two separate flow passages longitudinally through the intermediate portion of the housing, a first of said devices having packing means about its body means for sealing with the housing conduit wall to define a first flow path communicating the lower end of the housing with the upper end thereof through one of said flow passages and a second flow path communicating the housing opening communicating with the exterior thereof below the housing portion packed off with the housing opening communicating with said exterior above said housing portion through the other of said flow passages, a second of said devices having packing means about its body means for sealing with the housing conduit wall to define a first flow path communicating the housing opening communicating with the exterior thereof above the housing portion packed off with the lower end of the housing through one of said flow passages and a second flow path communicating said lower end of the housing with the upper end thereof through the other of said flow passages, and means on said flow directing devices by which they may be selectively and alternately positioned within the housing conduit.

17. A well tool comprising, a tubular housing connected in a tubing string and having a conduit extending therethrough from one end to the other, an intermediate portion of said housing being packed off within a well casing, openings through the housing communicating the conduit therethrough with the exterior of the housing above and below the portion thereof packed off, a plurality of flow directing devices selectively and alternately positionable within the housing conduit, each such device including tubular body means spaced from the housing conduit when positioned therein to provide with the housing conduit two separate flow passages longitudinally through the intermediate portion of the housing, a first of said devices having packing means about its body means for sealing with the housing conduit to define a first flow path communicating the lower end of the housing with the housing opening communicating with the exterior thereof above the housing portion packed off through one of said flow passages and a second flow path communicating the housing opening communicating with the exterior thereof below the housing portion packed off with the upper end of the housing through the other of said flow passages, a second of said devices having packing means about its body means for sealing with the housing conduit wall to define a first flow path communicating the housing opening communicating with the exterior thereof above the housing portion packed off with the lower end of the housing through one of said flow passages and a second flow path communicating said lower end of the housing with the upper end thereof through the other of said flow passages, and means on said flow directing devices by which they may be selectively and alternately positioned within the housing conduit.

References Cited in the file of this patent

UNITED STATES PATENTS

| | | |
|---|---|---|
| 2,368,428 | Saurenman | Jan. 30, 1945 |
| 2,403,987 | Lewis | July 16, 1946 |
| 2,433,942 | Works | Jan. 6, 1948 |
| 2,531,258 | Cranfill | Nov. 21, 1950 |
| 2,649,916 | Brown | Aug. 25, 1953 |
| 2,695,671 | Kingston | Nov. 30, 1954 |
| 2,717,041 | Brown | Sept. 6, 1955 |
| 2,766,831 | Otis | Oct. 16, 1956 |